(12) United States Patent
Sharma et al.

(10) Patent No.: US 12,248,311 B2
(45) Date of Patent: Mar. 11, 2025

(54) SYSTEM AND METHOD FOR DETERMINING AND PREDICTING VULNERABILITY OF BUILDING MANAGEMENT SYSTEMS

(71) Applicant: Johnson Controls Technology Company, Auburn Hills, MI (US)

(72) Inventors: Nidhi Sharma, Delhi (IN); Anantharaman Iyer, Pune (IN)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 17/204,381

(22) Filed: Mar. 17, 2021

(65) Prior Publication Data

US 2021/0294317 A1  Sep. 23, 2021

(30) Foreign Application Priority Data

Mar. 17, 2020  (IN) .............................. 202021011390

(51) Int. Cl.
*G05B 23/02* (2006.01)
*G05B 15/02* (2006.01)
*G16Y 30/10* (2020.01)

(52) U.S. Cl.
CPC ......... *G05B 23/0283* (2013.01); *G05B 15/02* (2013.01); *G05B 23/0213* (2013.01); *G05B 23/0221* (2013.01); *G05B 23/0275* (2013.01); *G16Y 30/10* (2020.01)

(58) Field of Classification Search
CPC ................ G05B 23/0283; G05B 15/02; G05B 23/0213; G05B 23/0221; G05B 23/0275; G16Y 30/10
See application file for complete search history.

(56) References Cited

U.S. PATENT DOCUMENTS

| | | | | |
|---|---|---|---|---|
| 6,414,969 B1 * | 7/2002 | Herring | ................. | H04W 76/20 370/496 |
| 6,973,067 B1 * | 12/2005 | Haartsen | ............... | H04L 12/403 370/347 |
| 7,406,299 B1 * | 7/2008 | Hudson | ................... | H04L 45/22 455/426.1 |
| 8,898,526 B1 * | 11/2014 | Noujeim | ................... | H04L 1/24 370/242 |
| 10,419,450 B2 | 9/2019 | Muddu et al. | | |

(Continued)

*Primary Examiner* — Lina Cordero
*Assistant Examiner* — Lyudmila Zaykova-Feldman
(74) *Attorney, Agent, or Firm* — Foley & Lardner LLP

(57) ABSTRACT

A system for predicting the vulnerability of a building management system (BMS) includes one or more memory devices configured to store instructions that, when executed on one or more processors, cause the one or more processors to establish a first communication link to a first data source and receive a first data using a communication module communicatively coupled to the processor. The first data includes information related to at least one of a plurality of IoT-enabled devices. The system is further configured to generate a historical record composed of a plurality of received data feeds received from a plurality of data feeds at unanticipated time intervals and analyze at least one of the plurality of data feeds with at least one or more of: the first data, the historical record, and another of the plurality of data feeds to predict the vulnerability of the BMS.

20 Claims, 8 Drawing Sheets

(56) References Cited

U.S. PATENT DOCUMENTS

| | | | |
|---|---|---|---|
| 2003/0065409 A1* | 4/2003 | Raeth | G08B 31/00 |
| | | | 700/28 |
| 2004/0123143 A1* | 6/2004 | Katz | H04L 63/0428 |
| | | | 726/3 |
| 2006/0129679 A1* | 6/2006 | Hlasny | H04L 47/24 |
| | | | 709/227 |
| 2006/0161691 A1* | 7/2006 | Katibian | G03B 17/00 |
| | | | 710/5 |
| 2007/0112545 A1* | 5/2007 | Barford | G06F 17/141 |
| | | | 702/191 |
| 2008/0313698 A1* | 12/2008 | Zhao | H04W 12/069 |
| | | | 709/228 |
| 2011/0071685 A1 | 3/2011 | Huneycutt et al. | |
| 2012/0259583 A1* | 10/2012 | Noboa | H02J 13/00016 |
| | | | 702/179 |
| 2013/0014226 A1* | 1/2013 | Larson | H04L 61/30 |
| | | | 726/4 |
| 2013/0204439 A1* | 8/2013 | Scelzi | G05B 11/01 |
| | | | 702/61 |
| 2014/0316584 A1* | 10/2014 | Matsuoka | G05B 15/02 |
| | | | 700/278 |
| 2015/0063114 A1* | 3/2015 | Praveenkumar | H04W 28/0231 |
| | | | 370/235 |
| 2017/0006135 A1* | 1/2017 | Siebel | G06Q 10/06 |
| 2017/0346851 A1* | 11/2017 | Drake | H04L 9/0838 |
| 2018/0102954 A1* | 4/2018 | Schubert | H04L 12/28 |
| 2018/0102958 A1* | 4/2018 | Guthrie | G06Q 10/10 |
| 2018/0131408 A1* | 5/2018 | Austad | H04L 63/18 |
| 2018/0253569 A1* | 9/2018 | Swierk | G06F 21/554 |
| 2018/0268304 A1* | 9/2018 | Manadhata | G06N 5/04 |
| 2019/0215688 A1* | 7/2019 | Zavesky | H04L 67/56 |
| 2019/0238584 A1* | 8/2019 | Somasundaram | H04L 63/1433 |
| 2020/0081870 A1* | 3/2020 | McCoy | H04L 67/61 |
| 2020/0396244 A1* | 12/2020 | Paturi | G06N 5/022 |
| 2021/0233388 A1* | 7/2021 | Martin | H04M 1/72421 |
| 2021/0351882 A1* | 11/2021 | Ayadurai | H04L 5/0044 |
| 2022/0225406 A1* | 7/2022 | Kim | H04W 74/0866 |

* cited by examiner

SYSTEM AND METHOD FOR DETERMINING AND PREDICTING VULNERABILITY OF BUILDING MANAGEMENT SYSTEMS

CROSS REFERENCE TO RELATED APPLICATIONS

This application claims the benefit of and priority to Indian application No. 202021011390, filed Mar. 17, 2020, the entire disclosure of which is incorporated herein by reference in its entirety.

BACKGROUND

The present disclosure relates generally to building management systems. More particularly, the present disclosure relates to predicting vulnerability of the building management systems.

A building management system (BMS) is, in general, a system of devices configured to control, monitor, and manage equipment in or around a building or building area. A BMS can include a heating, ventilation, or air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include METASYS® building controllers or other devices sold by Johnson Controls, Inc., as well as building devices and components from other sources.

A BMS may include one or more computer systems (e.g., servers, BMS controllers, etc.) that serve as enterprise level controllers, application or data servers, head nodes, master controllers, or field controllers for the BMS. Such computer systems may communicate with multiple downstream building systems or subsystems (e.g., an HVAC system, a security system, etc.) according to like or disparate protocols (e.g., LON, BACnet, etc.). The computer systems may also provide one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the BMS, its subsystems, and devices.

Typically, Building Management Systems (BMS) are deployed in a building to add an essence of intelligent ability. The BMSs (also referred as building automation systems) employ IoT-enabled devices to improve its processing capabilities. However, with IoT-enabled devices in place for improving the intelligent ability and modernization of the buildings, the BMSs are becoming vulnerable to cyberattacks, which is not desired. Recent studies have shown that IoT attacks are escalating at an alarming rate of 217.5% in volume and around 40.8% of smart homes having at least one IoT device are vulnerable to remote attacks.

In today's building automation ecosystem, IT infrastructure and OT (Operational Technologies)/IoT-enabled devices coexist in the same premise physically but OT components are not mapped or called out clearly in the IT infrastructure. The devices associated with the BMS are generally installed at locations which are difficult to access physically. Therefore, vulnerability detection or prevention becomes next to impossible because of this ambiguity.

Further, although BMSs are multi-tier architecture systems and they communicate with each other for managing the building efficiently, they continue to exist in isolation. The IT infrastructure are incapable of keeping track of the BMS devices and therefore, many a times, any kind of attack(s) on the BMS devices fail to get noticed. Additionally, the BMS's devices do not have sophisticated detection mechanisms in place which make them soft target for attackers to attack the building infrastructure or can often be used as pivot systems in large scale attacks.

There is, therefore, felt a need to provide a system and a method for determining and predicting vulnerability of a BMS.

SUMMARY

Some embodiments of the present disclosure envisage a system for predicting and determining vulnerability of a BMS.

The system comprises a communication module and a processing circuit which is implemented using one or more processor(s). The processing circuit is communicatively coupled with the communication module to establish a communication link with a first data source, a plurality of IoT-enabled devices associated with the BMS, one or more remote controllers, and one or more remote data sources.

In another embodiment of the present disclosure, the processing circuit is enabled to receive a first data from the first data source, and may be configured to store the received first data in a memory. In another embodiment, the processing circuit may be enabled to receive, at unanticipated time intervals, a second data from each of the IoT-enabled devices, a third data from one or more remote data sources, and outlier data from one or more remote controllers. Further, the processing circuit may be configured to store the received first data, second data, third data, and outlier data in the memory as historical feed for each of the IoT-enabled devices.

In some embodiments of the present disclosure, the processing circuit may be configured to analyze at least one of the first data and the second data with at least one of the third data, the outlier data, and the historical data for each of the IoT-enabled devices to (1) determine vulnerability of the IoT-enabled device, and therefore the BMS, by generating a vulnerability detection signal, wherein the vulnerability detection signal contains location co-ordinates of the device being vulnerable and (2) generate a prediction signal predicting vulnerability of the IoT-enabled device, and therefore the BMS, wherein the prediction signal contains location co-ordinates of the IoT-enabled device being predicted as vulnerable.

In some embodiments of the present disclosure, the processing circuit may be configured to establish the communication link with the plurality of IoT-enabled devices at unanticipated time intervals to facilitate reception of the second data from each of the plurality of IoT-enabled devices, wherein the second data comprises one or more information pertaining to one or more parameters of the IoT-enabled device.

In some embodiments of the present disclosure, the processing circuit may be configured to establish the communication link with the one or more remote data source(s), at unanticipated time intervals, to receive the third data corresponding to one or more of the IoT-enabled devices, wherein the third data comprises at least one of: information requested from at least one remote data source, wherein the information requested corresponds to one or more parameters populated with the second data, and threat information pertaining to one or more of the IoT-enabled devices.

In some embodiments of the present disclosure, a method for determining and predicting vulnerability of a BMS having a plurality of IoT-enabled devices is shown. The steps performed by the processing circuit to determine and predict vulnerability of the BMS comprises: establishing, a communication link with a first data source via a communication module to receive a first data comprising a layout having location coordinates and application software details corresponding to each of the IoT-enabled devices. Storing, the received first data in a memory. Establishing, a communication link with the plurality of IoT-enabled devices via the communication module to receive a second data from each of the IoT-enabled devices, wherein the second data comprises one or more information pertaining to one or more parameters of the IoT-enabled devices. Establishing, a communication link with at least one remote data source via the communication module to receive a third data corresponding to one or more of the IoT-enabled devices. Establishing, a communication link with one or more remote controllers to receive outlier data. Storing, the received second data, third data, and outlier data in the memory as historical record. And analyzing, at least one of the first data and the second data with at least one of the third data, outlier data, and the historical record for each of the IoT-enabled devices to either determine vulnerability of one or more IoT-enabled devices, or predict vulnerability of one or more IoT-enabled devices, or both.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, the present disclosure is intended to provide a system and a method for predicting vulnerability of the BMS according to some embodiments.

In some embodiments a system and a method identifies risks and threats to which the devices of the BMS may be vulnerable to from the time the devices of the BMS are commissioned till end of life.

In some embodiments a system and method facilitates easy visualization and management of the devices associated with the BMS.

In some embodiments a system and a method facilitates proactive prediction of operational technology devices/IoT devices specific vulnerabilities.

Building and Building Management System

Figure 1:
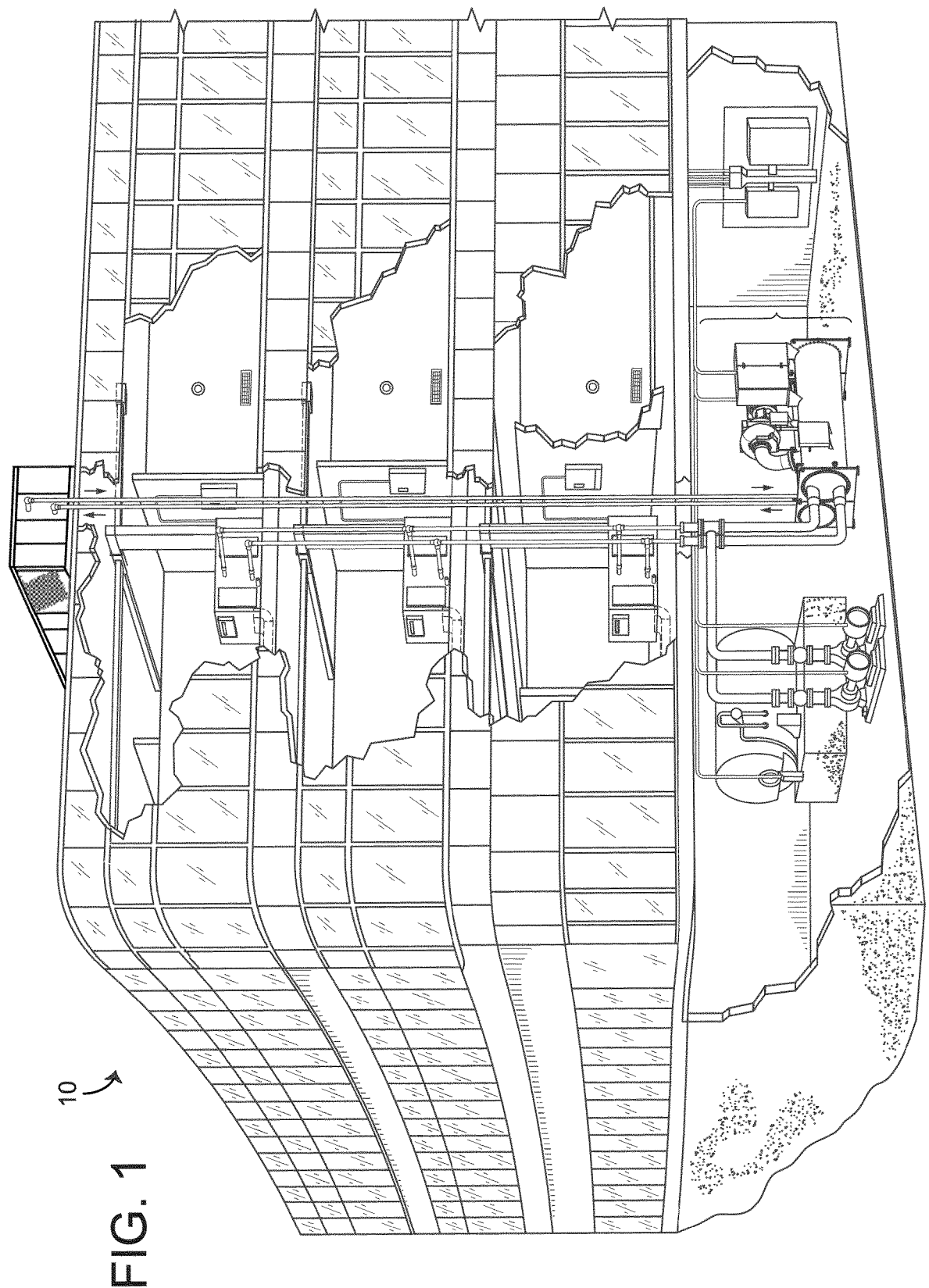
FIG. 1 is a drawing of a building equipped with a building management system (BMS), according to some embodiments.

Referring now to FIG. 1, a perspective view of a building 10 is shown, according to an exemplary embodiment. A BMS serves building 10. The BMS for building 10 may include any number or type of devices that serve building 10. For example, each floor may include one or more security devices, video surveillance cameras, fire detectors, smoke detectors, lighting systems, HVAC systems, or other building systems or devices. In modern BMSs, BMS devices can exist on different networks within the building (e.g., one or more wireless networks, one or more wired networks, etc.) and yet serve the same building space or control loop. For example, BMS devices may be connected to different communications networks or field controllers even if the devices serve the same area (e.g., floor, conference room, building zone, tenant area, etc.) or purpose (e.g., security, ventilation, cooling, heating, etc.).

BMS devices may collectively or individually be referred to as building equipment. Building equipment may include any number or type of BMS devices within or around building 10. For example, building equipment may include controllers, chillers, rooftop units, fire and security systems, elevator systems, thermostats, lighting, serviceable equipment (e.g., vending machines), and/or any other type of equipment that can be used to control, automate, or otherwise contribute to an environment, state, or condition of building 10. The terms "BMS devices," "BMS device" and "building equipment" are used interchangeably throughout this disclosure.

Figure 2:
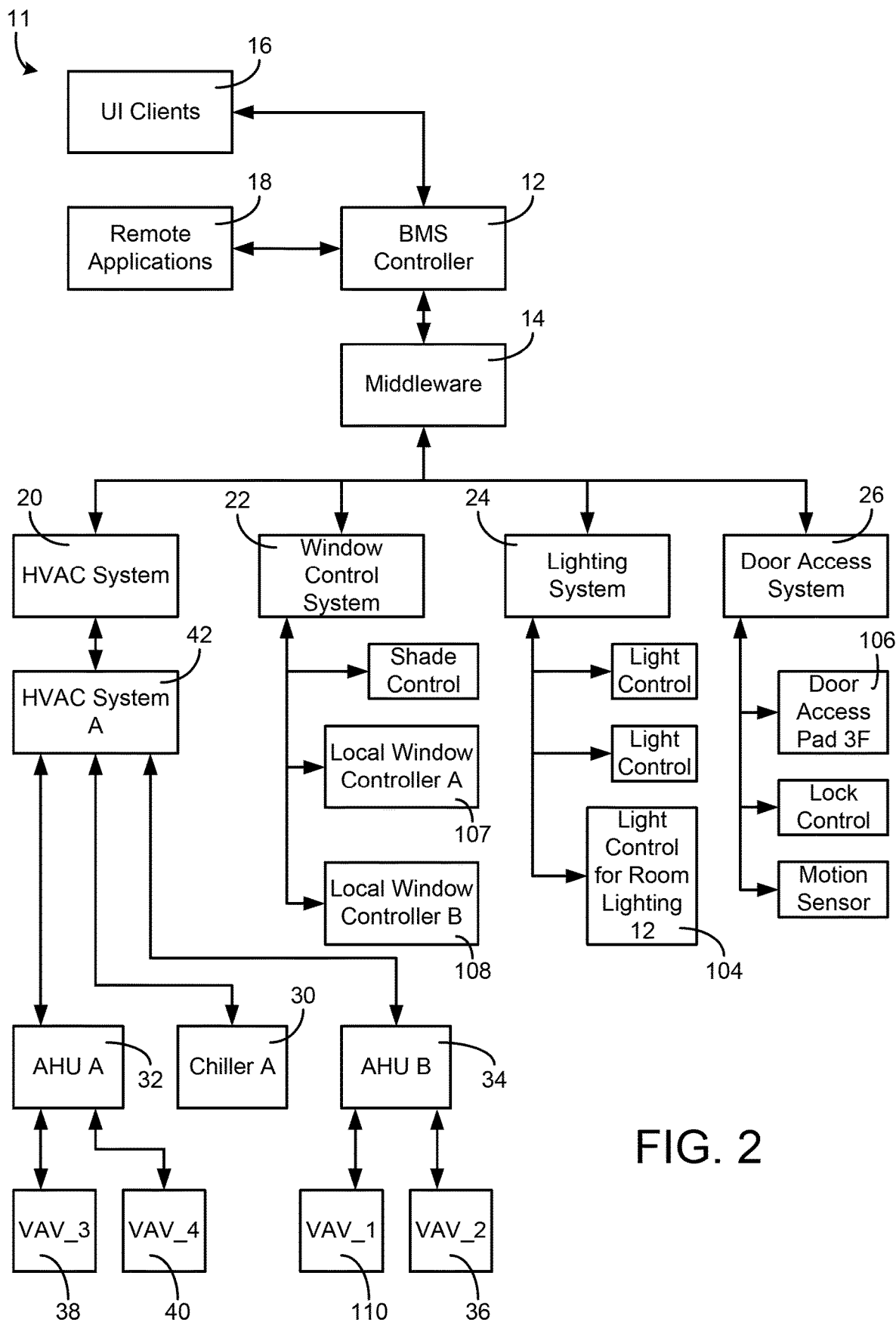
FIG. 2 is a block diagram of a BMS that serves the building of FIG. 1, according to some embodiments.

Referring now to FIG. 2, a block diagram of a BMS 11 for building 10 is shown, according to an exemplary embodiment. BMS 11 is shown to include a plurality of BMS subsystems 20-26. Each BMS subsystem 20-26 is connected to a plurality of BMS devices and makes data points for varying connected devices available to upstream BMS controller 12. Additionally, BMS subsystems 20-26 may encompass other lower-level subsystems. For example, an HVAC system may be broken down further as "HVAC system A," "HVAC system B," etc. In some buildings, multiple HVAC systems or subsystems may exist in parallel and may not be a part of the same HVAC system 20.

As shown in FIG. 2, BMS 11 may include a HVAC system 20. HVAC system 20 may control HVAC operations building 10. HVAC system 20 is shown to include a lower-level HVAC system 42 (named "HVAC system A"). HVAC system 42 may control HVAC operations for a specific floor or zone of building 10. HVAC system 42 may be connected to air handling units (AHUs) 32, 34 (named "AHU A" and "AHU B," respectively, in BMS 11). AHU 32 may serve variable air volume (VAV) boxes 38, 40 (named "VAV_3" and "VAV_4" in BMS 11). Likewise, AHU 34 may serve VAV boxes 36 and 110 (named "VAV_2" and "VAV_1"). HVAC system 42 may also include chiller 30 (named "Chiller A" in BMS 11). Chiller 30 may provide chilled fluid to AHU 32 and/or to AHU 34. HVAC system 42 may receive data (i.e., BMS inputs such as temperature sensor readings, damper positions, temperature setpoints, etc.) from AHUs 32, 34. HVAC system 42 may provide such BMS inputs to HVAC system 20 and on to middleware 14 and BMS controller 12. Similarly, other BMS subsystems may receive inputs from other building devices or objects and provide the received inputs to BMS controller 12 (e.g., via middleware 14).

Middleware 14 may include services that allow interoperable communication to, from, or between disparate BMS subsystems 20-26 of BMS 11 (e.g., HVAC systems from different manufacturers, HVAC systems that communicate according to different protocols, security/fire systems, IT resources, door access systems, etc.). Middleware 14 may be, for example, an EnNet server sold by Johnson Controls, Inc. While middleware 14 is shown as separate from BMS controller 12, middleware 14 and BMS controller 12 may integrated in some embodiments. For example, middleware 14 may be a part of BMS controller 12.

Still referring to FIG. 2, window control system 22 may receive shade control information from one or more shade controls, ambient light level information from one or more light sensors, and/or other BMS inputs (e.g., sensor information, setpoint information, current state information, etc.) from downstream devices. Window control system 22 may include window controllers 107, 108 (e.g., named "local window controller A" and "local window controller B," respectively, in BMS 11). Window controllers 107, 108 control the operation of subsets of window control system 22. For example, window controller 108 may control window blind or shade operations for a given room, floor, or building in the BMS.

Lighting system 24 may receive lighting related information from a plurality of downstream light controls (e.g., from room lighting 104). Door access system 26 may receive lock control, motion, state, or other door related information from a plurality of downstream door controls. Door access system 26 is shown to include door access pad 106 (named "Door Access Pad 3F"), which may grant or deny access to a building space (e.g., a floor, a conference room, an office, etc.) based on whether valid user credentials are scanned or entered (e.g., via a keypad, via a badge-scanning pad, etc.).

BMS subsystems 20-26 may be connected to BMS controller 12 via middleware 14 and may be configured to provide BMS controller 12 with BMS inputs from various BMS subsystems 20-26 and their varying downstream devices. BMS controller 12 may be configured to make differences in building subsystems transparent at the human-machine interface or client interface level (e.g., for connected or hosted user interface (UI) clients 16, remote applications 18, etc.). BMS controller 12 may be configured to describe or model different building devices and building subsystems using common or unified objects (e.g., software objects stored in memory) to help provide the transparency. Software equipment objects may allow developers to write applications capable of monitoring and/or controlling various types of building equipment regardless of equipment-specific variations (e.g., equipment model, equipment manufacturer, equipment version, etc.). Software building objects may allow developers to write applications capable of monitoring and/or controlling building zones on a zone-by-zone level regardless of the building subsystem makeup.

Figure 3:
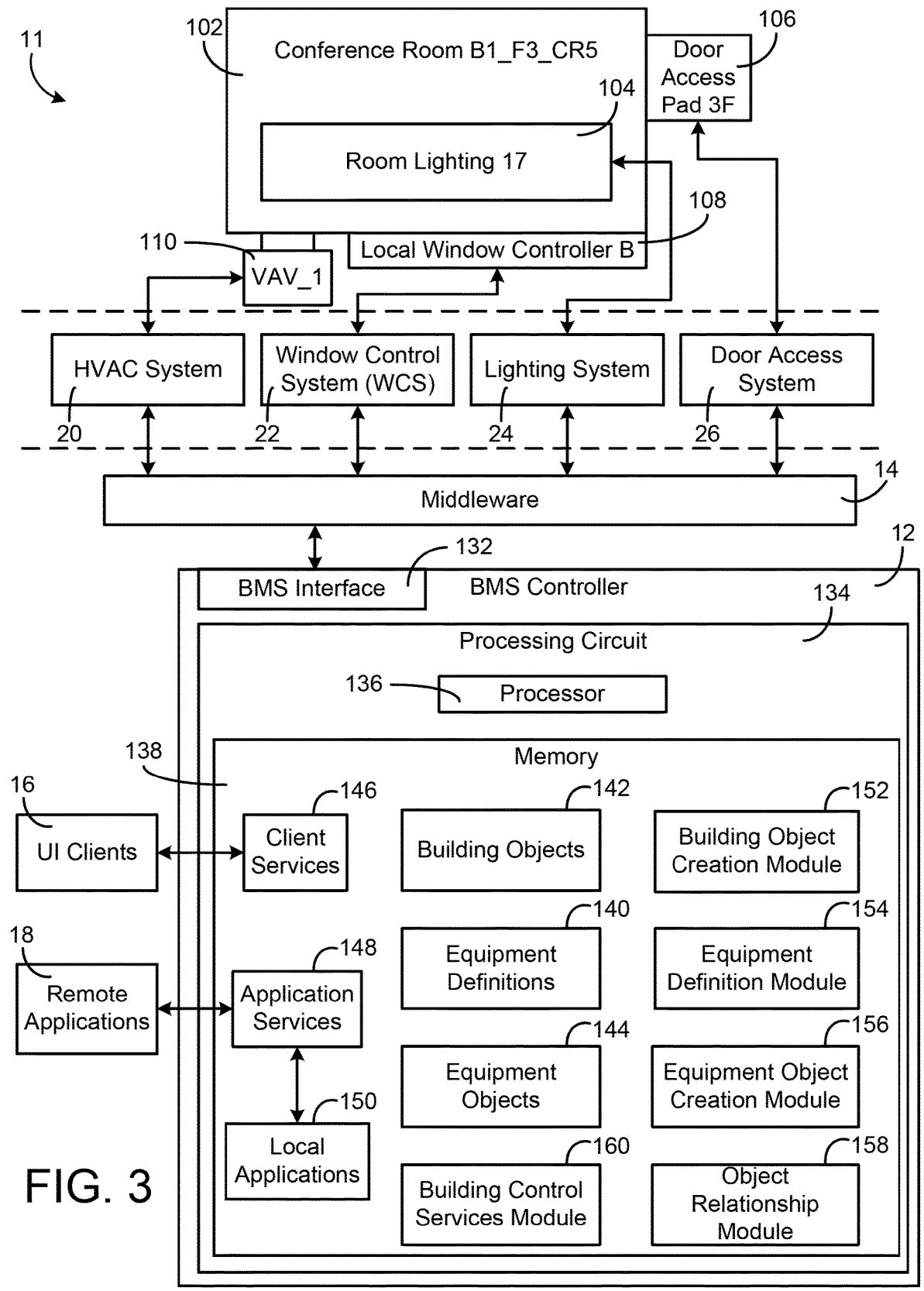
FIG. 3 is a block diagram of a BMS controller which can be used in the BMS of FIG. 2, according to some embodiments.

Referring now to FIG. 3, a block diagram illustrating a portion of BMS 11 in greater detail is shown, according to an exemplary embodiment. Particularly, FIG. 3 illustrates a portion of BMS 11 that services a conference room 102 of building 10 (named "B1_F3_CR5"). Conference room 102 may be affected by many different building devices connected to many different BMS subsystems. For example, conference room 102 includes or is otherwise affected by VAV box 110, window controller 108 (e.g., a blind controller), a system of lights 104 (named "Room Lighting 17"), and a door access pad 106.

Each of the building devices shown at the top of FIG. 3 may include local control circuitry configured to provide signals to their supervisory controllers or more generally to the BMS subsystems 20-26. The local control circuitry of the building devices shown at the top of FIG. 3 may also be configured to receive and respond to control signals, commands, setpoints, or other data from their supervisory controllers. For example, the local control circuitry of VAV box 110 may include circuitry that affects an actuator in response to control signals received from a field controller that is a part of HVAC system 20. Window controller 108 may include circuitry that affects windows or blinds in response to control signals received from a field controller that is part of window control system (WCS) 22. Room lighting 104 may include circuitry that affects the lighting in response to control signals received from a field controller that is part of lighting system 24. Access pad 106 may include circuitry that affects door access (e.g., locking or unlocking the door) in response to control signals received from a field controller that is part of door access system 26.

Still referring to FIG. 3, BMS controller 12 is shown to include a BMS interface 132 in communication with middleware 14. In some embodiments, BMS interface 132 is a communications interface. For example, BMS interface 132 may include wired or wireless interfaces (e.g., jacks, antennas, transmitters, receivers, transceivers, wire terminals, etc.) for conducting data communications with various systems, devices, or networks. BMS interface 132 can include an Ethernet card and port for sending and receiving data via an Ethernet-based communications network. In another example, BMS interface 132 includes a Wi-Fi transceiver for communicating via a wireless communications network. BMS interface 132 may be configured to communicate via local area networks or wide area networks (e.g., the Internet, a building WAN, etc.).

In some embodiments, BMS interface 132 and/or middleware 14 includes an application gateway configured to receive input from applications running on client devices. For example, BMS interface 132 and/or middleware 14 may include one or more wireless transceivers (e.g., a Wi-Fi transceiver, a Bluetooth transceiver, a NFC transceiver, a cellular transceiver, etc.) for communicating with client devices. BMS interface 132 may be configured to receive building management inputs from middleware 14 or directly from one or more BMS subsystems 20-26. BMS interface 132 and/or middleware 14 can include any number of software buffers, queues, listeners, filters, translators, or other communications-supporting services.

Still referring to FIG. 3, BMS controller 12 is shown to include a processing circuit 134 including a processor 136 and memory 138. Processor 136 may be a general purpose or specific purpose processor, an application specific integrated circuit (ASIC), one or more field programmable gate arrays (FPGAs), a group of processing components, or other suitable processing components. Processor 136 is configured to execute computer code or instructions stored in memory 138 or received from other computer readable media (e.g., CDROM, network storage, a remote server, etc.).

Memory 138 may include one or more devices (e.g., memory units, memory devices, storage devices, etc.) for storing data and/or computer code for completing and/or facilitating the various processes described in the present disclosure. Memory 138 may include random access memory (RAM), read-only memory (ROM), hard drive storage, temporary storage, non-volatile memory, flash memory, optical memory, or any other suitable memory for storing software objects and/or computer instructions. Memory 138 may include database components, object code components, script components, or any other type of information structure for supporting the various activities and information structures described in the present disclosure. Memory 138 may be communicably connected to processor 136 via processing circuit 134 and may include computer code for executing (e.g., by processor 136) one or more processes described herein. When processor 136 executes instructions stored in memory 138 for completing the various activities described herein, processor 136 generally configures BMS controller 12 (and more particularly processing circuit 134) to complete such activities.

Still referring to FIG. 3, memory 138 is shown to include building objects 142. In some embodiments, BMS controller 12 uses building objects 142 to group otherwise ungrouped or unassociated devices so that the group may be addressed or handled by applications together and in a consistent manner (e.g., a single user interface for controlling all of the BMS devices that affect a particular building zone or room). Building objects can apply to spaces of any granularity. For example, a building object can represent an entire building, a floor of a building, or individual rooms on each floor. In some embodiments, BMS controller 12 creates and/or stores a building object in memory 138 for each zone or room of building 10. Building objects 142 can be accessed by UI clients 16 and remote applications 18 to provide a comprehensive user interface for controlling and/or viewing information for a particular building zone. Building objects 142 may be created by building object creation module 152 and associated with equipment objects by object relationship module 158, described in greater detail below.

Still referring to FIG. 3, memory 138 is shown to include equipment definitions 140. Equipment definitions 140 stores the equipment definitions for various types of building equipment. Each equipment definition may apply to building equipment of a different type. For example, equipment definitions 140 may include different equipment definitions for variable air volume modular assemblies (VMAs), fan coil units, air handling units (AHUs), lighting fixtures, water pumps, and/or other types of building equipment.

Equipment definitions 140 define the types of data points that are generally associated with various types of building equipment. For example, an equipment definition for VMA may specify data point types such as room temperature, damper position, supply air flow, and/or other types data measured or used by the VMA. Equipment definitions 140 allow for the abstraction (e.g., generalization, normalization, broadening, etc.) of equipment data from a specific BMS device so that the equipment data can be applied to a room or space.

Each of equipment definitions 140 may include one or more point definitions. Each point definition may define a data point of a particular type and may include search criteria for automatically discovering and/or identifying data points that satisfy the point definition. An equipment definition can be applied to multiple pieces of building equipment of the same general type (e.g., multiple different VMA controllers). When an equipment definition is applied to a BMS device, the search criteria specified by the point definitions can be used to automatically identify data points provided by the BMS device that satisfy each point definition.

In some embodiments, equipment definitions 140 define data point types as generalized types of data without regard to the model, manufacturer, vendor, or other differences between building equipment of the same general type. The generalized data points defined by equipment definitions 140 allows each equipment definition to be referenced by or applied to multiple different variants of the same type of building equipment.

In some embodiments, equipment definitions 140 facilitate the presentation of data points in a consistent and user-friendly manner. For example, each equipment definition may define one or more data points that are displayed via a user interface. The displayed data points may be a subset of the data points defined by the equipment definition.

In some embodiments, equipment definitions 140 specify a system type (e.g., HVAC, lighting, security, fire, etc.), a system sub-type (e.g., terminal units, air handlers, central plants), and/or data category (e.g., critical, diagnostic, operational) associated with the building equipment defined by each equipment definition. Specifying such attributes of building equipment at the equipment definition level allows the attributes to be applied to the building equipment along with the equipment definition when the building equipment is initially defined. Building equipment can be filtered by various attributes provided in the equipment definition to facilitate the reporting and management of equipment data from multiple building systems.

Equipment definitions 140 can be automatically created by abstracting the data points provided by archetypal controllers (e.g., typical or representative controllers) for various types of building equipment. In some embodiments, equipment definitions 140 are created by equipment definition module 154, described in greater detail below.

Still referring to FIG. 3, memory 138 is shown to include equipment objects 144. Equipment objects 144 may be software objects that define a mapping between a data point type (e.g., supply air temperature, room temperature, damper position) and an actual data point (e.g., a measured or calculated value for the corresponding data point type) for various pieces of building equipment. Equipment objects 144 may facilitate the presentation of equipment-specific data points in an intuitive and user-friendly manner by associating each data point with an attribute identifying the corresponding data point type. The mapping provided by equipment objects 144 may be used to associate a particular data value measured or calculated by BMS 11 with an attribute that can be displayed via a user interface.

Equipment objects 144 can be created (e.g., by equipment object creation module 156) by referencing equipment definitions 140. For example, an equipment object can be created by applying an equipment definition to the data points provided by a BMS device. The search criteria included in an equipment definition can be used to identify data points of the building equipment that satisfy the point definitions. A data point that satisfies a point definition can be mapped to an attribute of the equipment object corresponding to the point definition.

Each equipment object may include one or more attributes defined by the point definitions of the equipment definition used to create the equipment object. For example, an equipment definition which defines the attributes "Occupied Command," "Room Temperature," and "Damper Position" may result in an equipment object being created with the same attributes. The search criteria provided by the equipment definition are used to identify and map data points associated with a particular BMS device to the attributes of the equipment object. The creation of equipment objects is described in greater detail below with reference to equipment object creation module 156.

Equipment objects 144 may be related with each other and/or with building objects 142. Causal relationships can be established between equipment objects to link equipment objects to each other. For example, a causal relationship can be established between a VMA and an AHU which provides airflow to the VMA. Causal relationships can also be established between equipment objects 144 and building objects 142. For example, equipment objects 144 can be associated with building objects 142 representing particular rooms or zones to indicate that the equipment object serves that room or zone. Relationships between objects are described in greater detail below with reference to object relationship module 158.

Still referring to FIG. 3, memory 138 is shown to include client services 146 and application services 148. Client services 146 may be configured to facilitate interaction and/or communication between BMS controller 12 and various internal or external clients or applications. For example, client services 146 may include web services or application programming interfaces available for communication by UI clients 16 and remote applications 18 (e.g., applications running on a mobile device, energy monitoring applications, applications allowing a user to monitor the performance of the BMS, automated fault detection and diagnostics systems, etc.). Application services 148 may facilitate direct or indirect communications between remote applications 18, local applications 150, and BMS controller 12. For example, application services 148 may allow BMS controller 12 to communicate (e.g., over a communications network) with remote applications 18 running on mobile devices and/or with other BMS controllers.

In some embodiments, application services 148 facilitate an applications gateway for conducting electronic data communications with UI clients 16 and/or remote applications 18. For example, application services 148 may be configured to receive communications from mobile devices and/or BMS devices. Client services 146 may provide client devices with a graphical user interface that consumes data points and/or display data defined by equipment definitions 140 and mapped by equipment objects 144.

Still referring to FIG. 3, memory 138 is shown to include a building object creation module 152. Building object creation module 152 may be configured to create the building objects stored in building objects 142. Building object creation module 152 may create a software building object for various spaces within building 10. Building object creation module 152 can create a building object for a space of any size or granularity. For example, building object creation module 152 can create a building object representing an entire building, a floor of a building, or individual rooms on each floor. In some embodiments, building object creation module 152 creates and/or stores a building object in memory 138 for each zone or room of building 10.

The building objects created by building object creation module 152 can be accessed by UI clients 16 and remote applications 18 to provide a comprehensive user interface for controlling and/or viewing information for a particular building zone. Building objects 142 can group otherwise ungrouped or unassociated devices so that the group may be addressed or handled by applications together and in a consistent manner (e.g., a single user interface for controlling all of the BMS devices that affect a particular building zone or room). In some embodiments, building object creation module 152 uses the systems and methods described in U.S. patent application Ser. No. 12/887,390, filed Sep. 21, 2010, for creating software defined building objects.

In some embodiments, building object creation module 152 provides a user interface for guiding a user through a process of creating building objects. For example, building object creation module 152 may provide a user interface to client devices (e.g., via client services 146) that allows a new space to be defined. In some embodiments, building object creation module 152 defines spaces hierarchically. For example, the user interface for creating building objects may prompt a user to create a space for a building, for floors within the building, and/or for rooms or zones within each floor.

In some embodiments, building object creation module 152 creates building objects automatically or semi-automatically. For example, building object creation module 152 may automatically define and create building objects using data imported from another data source (e.g., user view folders, a table, a spreadsheet, etc.). In some embodiments, building object creation module 152 references an existing hierarchy for BMS 11 to define the spaces within building 10. For example, BMS 11 may provide a listing of controllers for building 10 (e.g., as part of a network of data points) that have the physical location (e.g., room name) of the controller in the name of the controller itself. Building object creation module 152 may extract room names from the names of BMS controllers defined in the network of data points and create building objects for each extracted room. Building objects may be stored in building objects 142.

Still referring to FIG. 3, memory 138 is shown to include an equipment definition module 154. Equipment definition module 154 may be configured to create equipment definitions for various types of building equipment and to store the equipment definitions in equipment definitions 140. In some embodiments, equipment definition module 154 creates equipment definitions by abstracting the data points provided by archetypal controllers (e.g., typical or representative controllers) for various types of building equipment. For example, equipment definition module 154 may receive a user selection of an archetypal controller via a user interface. The archetypal controller may be specified as a user input or selected automatically by equipment definition module 154. In some embodiments, equipment definition module 154 selects an archetypal controller for building equipment associated with a terminal unit such as a VMA.

Equipment definition module 154 may identify one or more data points associated with the archetypal controller. Identifying one or more data points associated with the archetypal controller may include accessing a network of data points provided by BMS 11. The network of data points may be a hierarchical representation of data points that are measured, calculated, or otherwise obtained by various BMS devices. BMS devices may be represented in the network of data points as nodes of the hierarchical representation with associated data points depending from each BMS device. Equipment definition module 154 may find the node corresponding to the archetypal controller in the network of data points and identify one or more data points which depend from the archetypal controller node.

Equipment definition module 154 may generate a point definition for each identified data point of the archetypal controller. Each point definition may include an abstraction of the corresponding data point that is applicable to multiple different controllers for the same type of building equipment. For example, an archetypal controller for a particular VMA (i.e., "VMA-20") may be associated an equipment-specific data point such as "VMA-20.DPR-POS" (i.e., the damper position of VMA-20) and/or "VMA-20.SUP-FLOW" (i.e., the supply air flow rate through VMA-20).

Equipment definition module 154 abstract the equipment-specific data points to generate abstracted data point types that are generally applicable to other equipment of the same type. For example, equipment definition module 154 may abstract the equipment-specific data point "VMA-20.DPR-POS" to generate the abstracted data point type "DPR-POS" and may abstract the equipment-specific data point "VMA-20.SUP-FLOW" to generate the abstracted data point type "SUP-FLOW." Advantageously, the abstracted data point types generated by equipment definition module 154 can be applied to multiple different variants of the same type of building equipment (e.g., VMAs from different manufacturers, VMAs having different models or output data formats, etc.).

In some embodiments, equipment definition module 154 generates a user-friendly label for each point definition. The user-friendly label may be a plain text description of the variable defined by the point definition. For example, equipment definition module 154 may generate the label "Supply Air Flow" for the point definition corresponding to the abstracted data point type "SUP-FLOW" to indicate that the data point represents a supply air flow rate through the VMA. The labels generated by equipment definition module 154 may be displayed in conjunction with data values from BMS devices as part of a user-friendly interface.

In some embodiments, equipment definition module 154 generates search criteria for each point definition. The search criteria may include one or more parameters for identifying another data point (e.g., a data point associated with another controller of BMS 11 for the same type of building equipment) that represents the same variable as the point definition. Search criteria may include, for example, an instance number of the data point, a network address of the data point, and/or a network point type of the data point.

In some embodiments, search criteria include a text string abstracted from a data point associated with the archetypal controller. For example, equipment definition module 154 may generate the abstracted text string "SUP-FLOW" from the equipment-specific data point "VMA-20.SUP-FLOW." Advantageously, the abstracted text string matches other equipment-specific data points corresponding to the supply air flow rates of other BMS devices (e.g., "VMA-18.SUP-FLOW," "SUP-FLOW.VMA-01," etc.). Equipment definition module 154 may store a name, label, and/or search criteria for each point definition in memory 138.

Equipment definition module 154 may use the generated point definitions to create an equipment definition for a particular type of building equipment (e.g., the same type of building equipment associated with the archetypal controller). The equipment definition may include one or more of the generated point definitions. Each point definition defines a potential attribute of BMS devices of the particular type and provides search criteria for identifying the attribute among other data points provided by such BMS devices.

In some embodiments, the equipment definition created by equipment definition module 154 includes an indication of display data for BMS devices that reference the equipment definition. Display data may define one or more data points of the BMS device that will be displayed via a user interface. In some embodiments, display data are user defined. For example, equipment definition module 154 may prompt a user to select one or more of the point definitions included in the equipment definition to be represented in the display data. Display data may include the user-friendly label (e.g., "Damper Position") and/or short name (e.g., "DPR-POS") associated with the selected point definitions.

In some embodiments, equipment definition module 154 provides a visualization of the equipment definition via a graphical user interface. The visualization of the equipment definition may include a point definition portion which displays the generated point definitions, a user input portion configured to receive a user selection of one or more of the point definitions displayed in the point definition portion, and/or a display data portion which includes an indication of an abstracted data point corresponding to each of the point definitions selected via the user input portion. The visualization of the equipment definition can be used to add, remove, or change point definitions and/or display data associated with the equipment definitions.

Equipment definition module 154 may generate an equipment definition for each different type of building equipment in BMS 11 (e.g., VMAs, chillers, AHUs, etc.). Equipment definition module 154 may store the equipment definitions in a data storage device (e.g., memory 138, equipment definitions 140, an external or remote data storage device, etc.).

Still referring to FIG. 3, memory 138 is shown to include an equipment object creation module 156. Equipment object creation module 156 may be configured to create equipment objects for various BMS devices. In some embodiments, equipment object creation module 156 creates an equipment object by applying an equipment definition to the data points provided by a BMS device. For example, equipment object creation module 156 may receive an equipment definition created by equipment definition module 154. Receiving an equipment definition may include loading or retrieving the equipment definition from a data storage device.

In some embodiments, equipment object creation module 156 determines which of a plurality of equipment definitions to retrieve based on the type of BMS device used to create the equipment object. For example, if the BMS device is a VMA, equipment object creation module 156 may retrieve the equipment definition for VMAs; whereas if the BMS device is a chiller, equipment object creation module 156 may retrieve the equipment definition for chillers. The type of BMS device to which an equipment definition applies may be stored as an attribute of the equipment definition. Equipment object creation module 156 may identify the type of BMS device being used to create the equipment object and retrieve the corresponding equipment definition from the data storage device.

In other embodiments, equipment object creation module 156 receives an equipment definition prior to selecting a BMS device. Equipment object creation module 156 may identify a BMS device of BMS 11 to which the equipment definition applies. For example, equipment object creation module 156 may identify a BMS device that is of the same type of building equipment as the archetypal BMS device used to generate the equipment definition. In various embodiments, the BMS device used to generate the equipment object may be selected automatically (e.g., by equipment object creation module 156), manually (e.g., by a user) or semi-automatically (e.g., by a user in response to an automated prompt from equipment object creation module 156).

In some embodiments, equipment object creation module 156 creates an equipment discovery table based on the equipment definition. For example, equipment object creation module 156 may create an equipment discovery table having attributes (e.g., columns) corresponding to the variables defined by the equipment definition (e.g., a damper position attribute, a supply air flow rate attribute, etc.). Each column of the equipment discovery table may correspond to a point definition of the equipment definition. The equipment discovery table may have columns that are categorically defined (e.g., representing defined variables) but not yet mapped to any particular data points.

Equipment object creation module 156 may use the equipment definition to automatically identify one or more data points of the selected BMS device to map to the columns of the equipment discovery table. Equipment object creation module 156 may search for data points of the BMS device that satisfy one or more of the point definitions included in the equipment definition. In some embodiments, equipment object creation module 156 extracts a search criterion from each point definition of the equipment definition. Equipment object creation module 156 may access a data point network of the building automation system to identify one or more data points associated with the selected BMS device. Equipment object creation module 156 may use the extracted search criterion to determine which of the identified data points satisfy one or more of the point definitions.

In some embodiments, equipment object creation module 156 automatically maps (e.g., links, associates, relates, etc.) the identified data points of selected BMS device to the equipment discovery table. A data point of the selected BMS device may be mapped to a column of the equipment discovery table in response to a determination by equipment object creation module 156 that the data point satisfies the point definition (e.g., the search criteria) used to generate the column. For example, if a data point of the selected BMS device has the name "VMA-18.SUP-FLOW" and a search criterion is the text string "SUP-FLOW," equipment object creation module 156 may determine that the search criterion is met. Accordingly, equipment object creation module 156 may map the data point of the selected BMS device to the corresponding column of the equipment discovery table.

Advantageously, equipment object creation module 156 may create multiple equipment objects and map data points to attributes of the created equipment objects in an automated fashion (e.g., without human intervention, with minimal human intervention, etc.). The search criteria provided by the equipment definition facilitates the automatic discovery and identification of data points for a plurality of equipment object attributes. Equipment object creation module 156 may label each attribute of the created equipment objects with a device-independent label derived from the equipment definition used to create the equipment object. The equipment objects created by equipment object creation module 156 can be viewed (e.g., via a user interface) and/or interpreted by data consumers in a consistent and intuitive manner regardless of device-specific differences between BMS devices of the same general type. The equipment objects created by equipment object creation module 156 may be stored in equipment objects 144.

Still referring to FIG. 3, memory 138 is shown to include an object relationship module 158. Object relationship module 158 may be configured to establish relationships between equipment objects 144. In some embodiments, object relationship module 158 establishes causal relationships between equipment objects 144 based on the ability of one BMS device to affect another BMS device. For example, object relationship module 158 may establish a causal relationship between a terminal unit (e.g., a VMA) and an upstream unit (e.g., an AHU, a chiller, etc.) which affects an input provided to the terminal unit (e.g., air flow rate, air temperature, etc.).

Object relationship module 158 may establish relationships between equipment objects 144 and building objects 142 (e.g., spaces). For example, object relationship module 158 may associate equipment objects 144 with building objects 142 representing particular rooms or zones to indicate that the equipment object serves that room or zone. In some embodiments, object relationship module 158 provides a user interface through which a user can define relationships between equipment objects 144 and building objects 142. For example, a user can assign relationships in a "drag and drop" fashion by dragging and dropping a building object and/or an equipment object into a "serving" cell of an equipment object provided via the user interface to indicate that the BMS device represented by the equipment object serves a particular space or BMS device.

Still referring to FIG. 3, memory 138 is shown to include a building control services module 160. Building control services module 160 may be configured to automatically control BMS 11 and the various subsystems thereof. Building control services module 160 may utilize closed loop control, feedback control, PI control, model predictive control, or any other type of automated building control methodology to control the environment (e.g., a variable state or condition) within building 10.

Building control services module 160 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via BMS interface 132. Building control services module 160 may apply the various inputs to a building energy use model and/or a control algorithm to determine an output for one or more building control devices (e.g., dampers, air handling units, chillers, boilers, fans, pumps, etc.) in order to affect a variable state or condition within building 10 (e.g., zone temperature, humidity, air flow rate, etc.).

In some embodiments, building control services module 160 is configured to control the environment of building 10 on a zone-individualized level. For example, building control services module 160 may control the environment of two or more different building zones using different setpoints, different constraints, different control methodology, and/or different control parameters. Building control services module 160 may operate BMS 11 to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

In some embodiments, building control services module 160 uses the location of various BMS devices to translate an input received from a building system into an output or control signal for the building system. Building control services module 160 may receive location information for BMS devices and automatically set or recommend control parameters for the BMS devices based on the locations of the BMS devices. For example, building control services module 160 may automatically set a flow rate setpoint for a VAV box based on the size of the building zone in which the VAV box is located.

Building control services module 160 may determine which of a plurality of sensors to use in conjunction with a feedback control loop based on the locations of the sensors within building 10. For example, building control services module 160 may use a signal from a temperature sensor located in a building zone as a feedback signal for controlling the temperature of the building zone in which the temperature sensor is located.

In some embodiments, building control services module 160 automatically generates control algorithms for a controller or a building zone based on the location of the zone in the building 10. For example, building control services module 160 may be configured to predict a change in demand resulting from sunlight entering through windows based on the orientation of the building and the locations of the building zones (e.g., east-facing, west-facing, perimeter zones, interior zones, etc.).

Building control services module 160 may use zone location information and interactions between adjacent building zones (rather than considering each zone as an isolated system) to more efficiently control the temperature and/or airflow within building 10. For control loops that are conducted at a larger scale (i.e., floor level) building control services module 160 may use the location of each building zone and/or BMS device to coordinate control functionality between building zones. For example, building control services module 160 may consider heat exchange and/or air exchange between adjacent building zones as a factor in determining an output control signal for the building zones.

In some embodiments, building control services module 160 is configured to optimize the energy efficiency of building 10 using the locations of various BMS devices and the control parameters associated therewith. Building control services module 160 may be configured to achieve control setpoints using building equipment with a relatively lower energy cost (e.g., by causing airflow between connected building zones) in order to reduce the loading on building equipment with a relatively higher energy cost (e.g., chillers and roof top units). For example, building control services module 160 may be configured to move warmer air from higher elevation zones to lower elevation zones by establishing pressure gradients between connected building zones.

Figure 4:
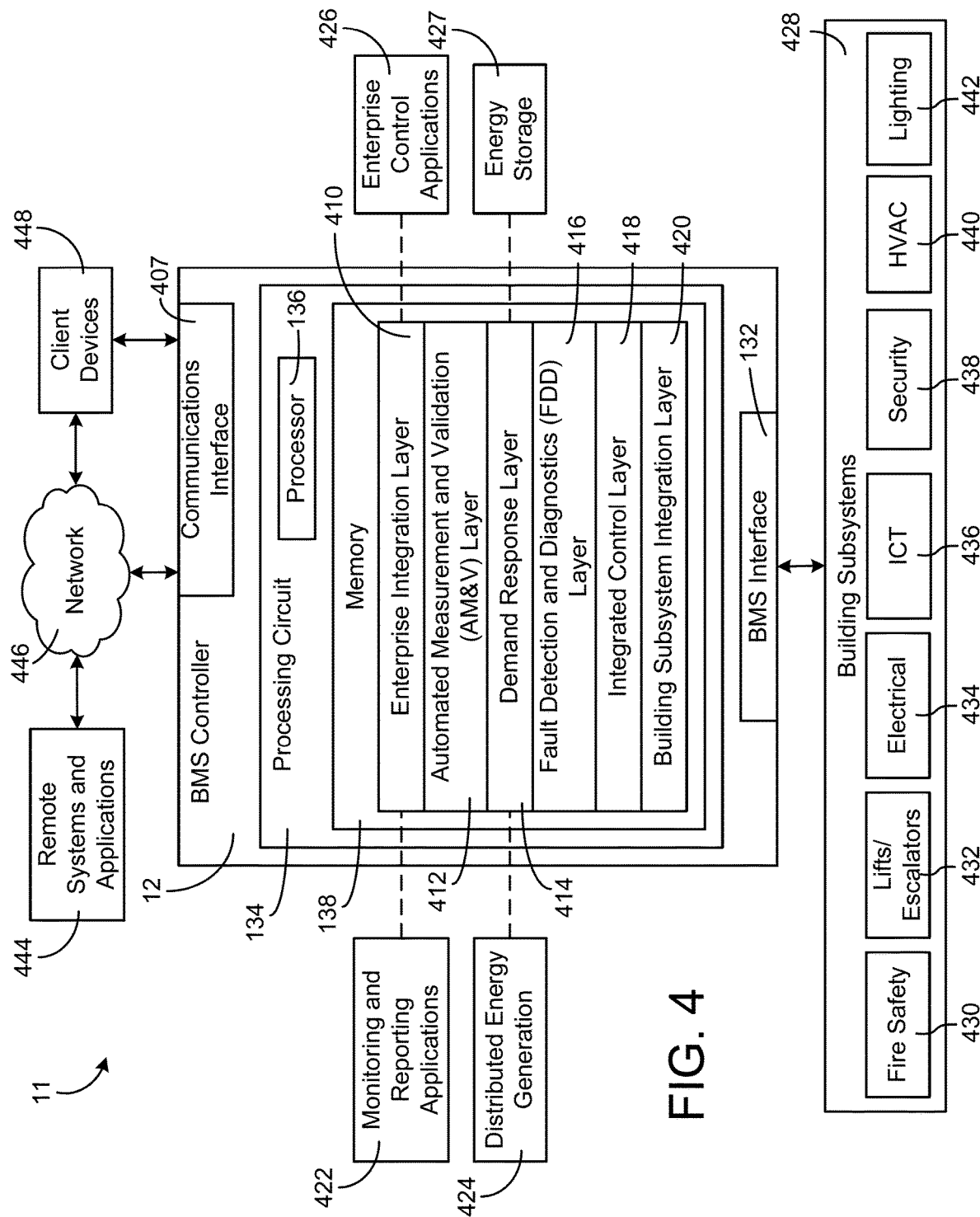
FIG. 4 is another block diagram of the BMS that serves the building of FIG. 1, according to some embodiments.

Referring now to FIG. 4, another block diagram illustrating a portion of BMS 11 in greater detail is shown, according to some embodiments. BMS 11 can be implemented in building 10 to automatically monitor and control various building functions. BMS 11 is shown to include BMS controller 12 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10.

Each of building subsystems 428 can include any number of devices, controllers, and connections for completing its individual functions and control activities. HVAC subsystem 440 can include many of the same components as HVAC system 20, as described with reference to FIGS. 2-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 12 is shown to include a communications interface 407 and a BMS interface 132. Interface 407 may facilitate communications between BMS controller 12 and external applications (e.g., monitoring and reporting applications 422, enterprise control applications 426, remote systems and applications 444, applications residing on client devices 448, etc.) for allowing user control, monitoring, and adjustment to BMS controller 12 and/or subsystems 428. Interface 407 may also facilitate communications between BMS controller 12 and client devices 448. BMS interface 132 may facilitate communications between BMS controller 12 and building subsystems 428 (e.g., HVAC, lighting security, lifts, power distribution, business, etc.).

Interfaces 407, 132 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 132 can be direct (e.g., local wired or wireless communications) or via a communications network 446 (e.g., a WAN, the Internet, a cellular network, etc.). For example, interfaces 407, 132 can include an Ethernet card and port for sending and receiving data via an Ethernet-based communications link or network. In another example, interfaces 407, 132 can include a Wi-Fi transceiver for communicating via a wireless communications network. In another example, one or both of interfaces 407, 132 can include cellular or mobile phone communications transceivers. In some embodiments, communications interface 407 is a power line communications interface and BMS interface 132 is an Ethernet interface. In other embodiments, both communications interface 407 and BMS interface 132 are Ethernet interfaces or are the same Ethernet interface.

Still referring to FIG. 4, BMS controller 12 is shown to include a processing circuit 134 including a processor 136 and memory 138. Processing circuit 134 can be communicably connected to BMS interface 132 and/or communications interface 407 such that processing circuit 134 and the various components thereof can send and receive data via interfaces 407, 132. Processor 136 can be implemented as a general purpose processor, an application specific integrated circuit (ASIC), one or more field programmable gate arrays (FPGAs), a group of processing components, or other suitable electronic processing components.

Memory 138 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 138 can be or include volatile memory or non-volatile memory. Memory 138 can include database components, object code components, script components, or any other type of information structure for supporting the various activities and information structures described in the present application. According to some embodiments, memory 138 is communicably connected to processor 136 via processing circuit 134 and includes computer code for executing (e.g., by processing circuit 134 and/or processor 136) one or more processes described herein.

In some embodiments, BMS controller 12 is implemented within a single computer (e.g., one server, one housing, etc.). In various other embodiments BMS controller 12 can be distributed across multiple servers or computers (e.g., that can exist in distributed locations). Further, while FIG. 4 shows applications 422 and 426 as existing outside of BMS controller 12, in some embodiments, applications 422 and 426 can be hosted within BMS controller 12 (e.g., within memory 138).

Still referring to FIG. 4, memory 138 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 11.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 12. In yet other embodiments, enterprise control applications 426 can work with layers 410-420 to optimize building performance (e.g., efficiency, energy use, comfort, or safety) based on inputs received at interface 407 and/or BMS interface 132.

Building subsystem integration layer 420 can be configured to manage communications between BMS controller 12 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427, or from other sources. Demand response layer 414 may receive inputs from other layers of BMS controller 12 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 11 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Figure 5:
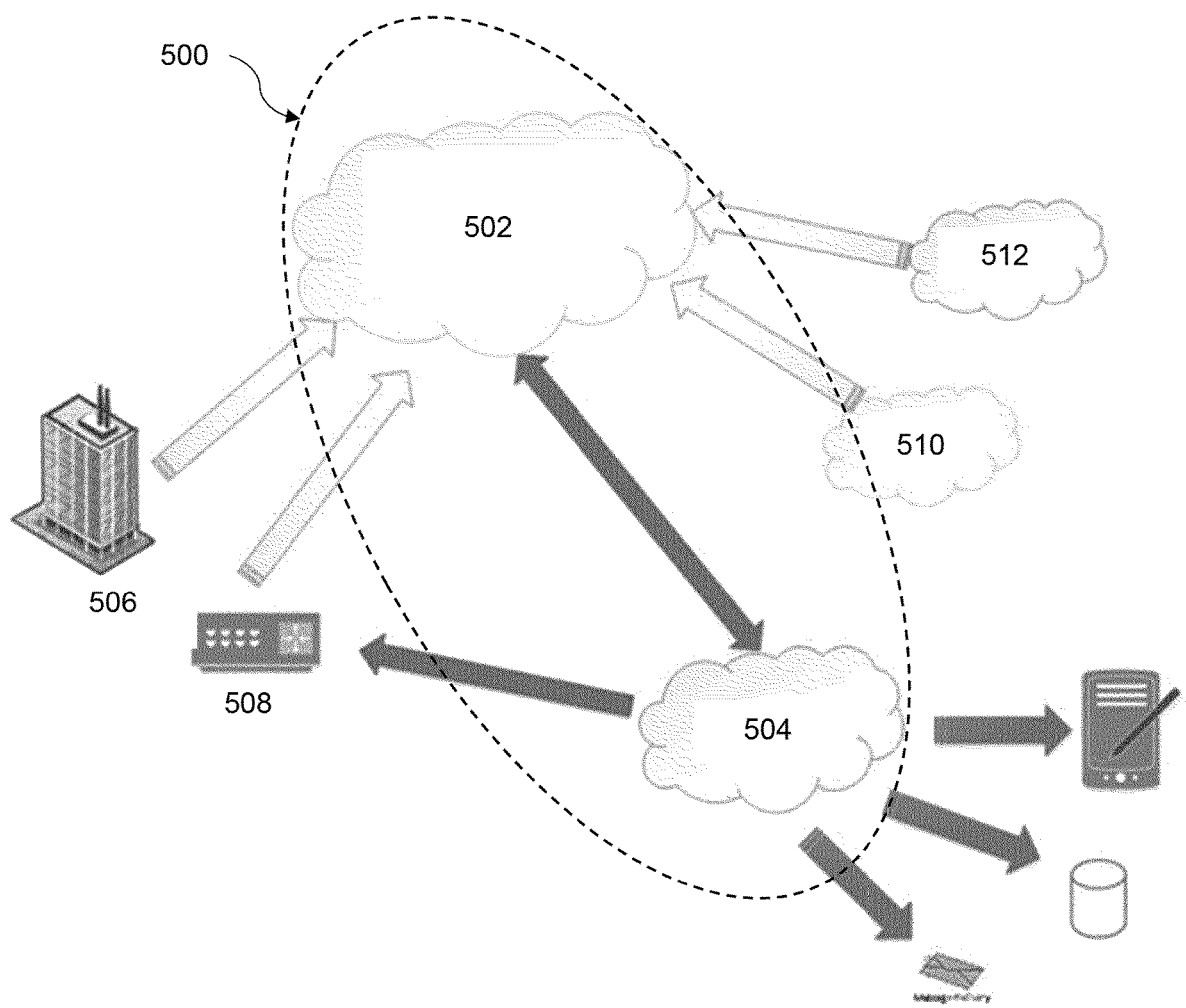
FIG. 5 is a schematic view of a system of the present disclosure in communication with a plurality of data sources, according to some embodiments.
Figure 6:
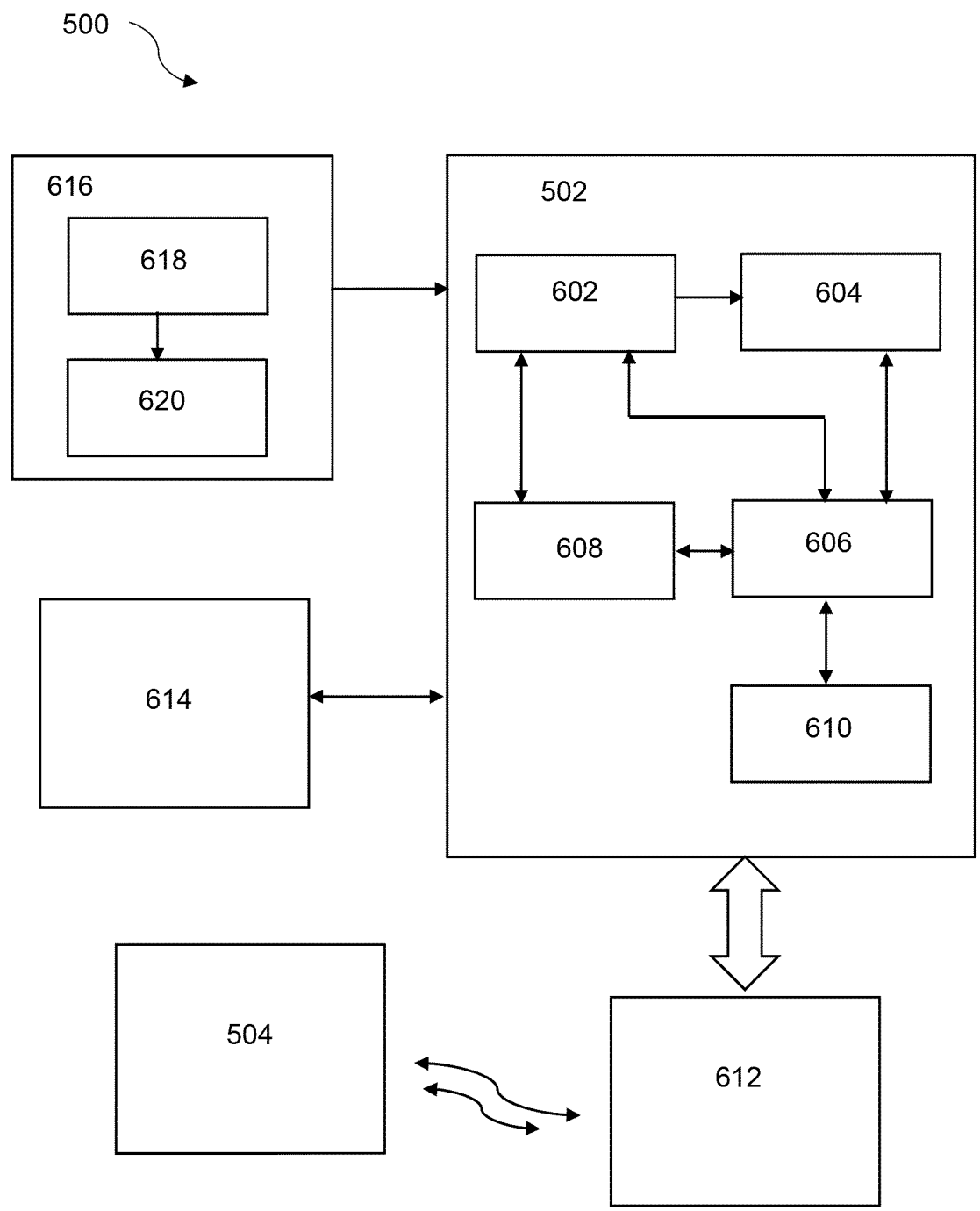
FIG. 6 is a block diagram of the system for determining and predicting vulnerability of the building management system (BMS) of FIG. 2 or FIG. 3.

System for Determining and Predicting Vulnerability of Building Management System Referring now to FIG. 5 and FIG. 6, the present disclosure shows a system 500 for determining and predicting vulnerability of a BMS (not specifically shown in FIGS. 5 and 6). In some embodiments, the BMS referred to may be the BMS as disclosed in FIGS. 2 and 3. In accordance with one embodiment of the present disclosure, the envisaged system 500 is enabled to determine and predict vulnerability of a plurality of BMSs.

In some embodiments, the system 500 may be enabled to communicate with a plurality of data sources, wherein the data sources may be selected from a group consisting of, but not limited to, a first data source 506, a plurality of IoT-enabled devices 508, one or more remote data sources 510, and one or more remote controllers 512. The system may be enabled to selectively extract data from each of the data sources (506-512) to determine and predict vulnerability of the BMS. In some embodiments, the BMS comprises a plurality of IoT-enabled devices 508 which may also be referred to as edge devices. In some embodiments, the IoT-enabled devices referred to may be and include the building subsystems 428 or building subsystem devices (e.g.) present in a BMS as disclosed in FIGS. 1-4. In some embodiments, the plurality of IoT-enabled devices 508 are adapted to be connected with one or more peripheral devices such as the building subsystems 428 or building subsystem devices 508. In some embodiments, the peripheral devices may be referred to as standard equipment capable of performing desired or routine tasks with none or limited communication capabilities.

In some embodiments, the system 500 of the present disclosure can be enabled to identify vulnerabilities of one or peripheral devices connected to the IoT-enabled device 508 based on the data received from the IoT-enabled device 508.

In some embodiments, the system 500 of the present disclosure may be implemented using a cloud server.

In some embodiments of the present disclosure, the system 500 comprises a communication module 612 (also referred as "communication interface 612") and a processing circuit 502. Although, the present disclosure describes the communication module 612 and the processing circuit 502 as a separate entity, it is to be understood that the communication module 612 can be integrated with the processing circuit 502.

The processing circuit 502 may be enabled to establish a communication link with the plurality of data sources (506-512), wherein the data sources may be selected from the group consisting of, but is not limited to, a first data source 506, a plurality of IoT-enabled devices 508, one or more remote data sources 510, and one or more remote controllers 512.

In some embodiments, the first data source 506 may represent one or more compact disks, external storage devices, databases, floppy disks, diskettes, computers, servers, portable storage devices, virtual servers, and the like. In some embodiments, one or more remote data sources 510 may correspond to remote servers associated with open source networks. In some embodiments, the one or more remote controllers 512 may correspond to BMS controllers affiliated with one or more distant BMSs or automation systems.

In some embodiments, the processing circuit 502 is implemented using one or more processor(s). Referring specifically to FIG. 6, processor 606 may be a general purpose or specific purpose processor, an application specific integrated circuit (ASIC), one or more field programmable gate arrays (FPGAs), a group of processing components, or other suitable processing components. The processor 606 is configured to execute computer code or instructions stored in a memory or received from other computer readable media (e.g., CDROM, network storage, a remote server, etc.).

In some embodiments memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. In some embodiments memory 610 may be communicably connected to the processor 606 via processing circuit 502 and may include computer code for executing (e.g., by the processor) one or more processes described herein. When processor 606 executes instructions stored in the Memory 610 for completing the various activities described herein, processor 606 generally configures the processing circuit 502 and its modules/unit to complete such activities.

The processing circuit 502 may be communicatively coupled with the communication module 612. In some embodiments, the processing circuit 502 may be configured to establish a communication link with the first data source 506 via the communication interface 612 to receive the first data. In some embodiments, the communication link established with the first data source 506 by the processing circuit 502 may be wired or wireless depending upon the capabilities of the communication module 612 and the first data source 506. In some embodiments, the communication module 612 may be enabled to establish a plug and play type communication link of the processing circuit 502 with the first data source 506. The processing circuit 502 may be configured to store the received first data in the memory 610, wherein the first data may comprise a layout having a plurality of IoT-enabled devices 508, and the location coordinate and the application software details pertaining to each of the IoT-enabled devices 508.

In some embodiments, the first data may be a Building Information Modeling (BIM) file.

In some embodiments, the first data may be static and may be fetched by the processing circuit 502 only at the time of initializing the BMS. In some embodiments, the application software details contained within the first data corresponds to an initial version of the software installed within each of the IoT-enabled devices 508.

In some embodiments the processing circuit 502 may be configured to establish a communication link with the plurality of IoT-enabled devices 508, via the communication module 612, and may be further configured to receive a second data from each of the IoT-enabled devices 508. In some embodiments, the second data comprises one or more information pertaining to one or more parameters of the IoT-enabled device. Additionally, the processing circuit 502 may be configured to establish a communication link with at least one remote data source, via the communication module, to receive a third data from the remote data sources corresponding to one or more of the IoT-enabled devices 508. In some embodiments, the third data comprises at least one of: information requested by the processing circuit 502 from the remote data source, wherein the information requested corresponds to the parameter(s) populated by the second data, and threat information, if any, pertaining to one or more of the IoT-enabled devices 508.

In some embodiments, the processing circuit 502 may be configured to keep track of the second data received from each of the IoT-enabled devices 508, wherein the processing circuit 502 may then establish the communication link with the remote data sources 510 to retrieve a third data such as intel feeds corresponding to the second data in order to perform one-to-one analysis and identify discrepancies between the third data and the second data. Alternatively, the processing circuit 502 may obtain threat information from the remote data source(s) 510 while the communication link is established. The threat information may be the intel feed provided by the remote data source 510.

In some embodiments, the processing circuit 502 may be enabled to receive the third data from the remote data source(s) 510 pertaining to each of the IoT-enabled devices 508, and may be further configured to filter the received third data, wherein the filtered third data may contain data corresponding to the parameters for which the second data is populated.

In some embodiments, the processing circuit 502 is configured to establish a communication link with one or more remote controllers 512 to receive the outlier data. Specifically, the outlier data is data collated by the remote controllers 512 which are beyond a desirable range, typically signifying the occurrence of a glitch or unexpected outcome which may be beyond the range of the IoT-enabled devices 508 interacting with the remote controller 512.

In some embodiments, a thin agent may be installed in each of said IoT-enabled devices 508, remote controllers 512, and remote data sources 510, wherein the thin agent may be configured to selectively transmit the data from the plurality of data sources 508-512 to the processing circuit. The second data, third data, and outlier data received from the IoT-enabled devices 508, remote data sources 510, and remote controllers 512 are respectively stored in the memory 610 by the processing circuit 502 as historical record, wherein each time the data is received the historical record is updated.

In some embodiments, the processing circuit 502 may be configured to analyze at least one of the first data from the first data source 506 and the received second data from the plurality of IoT-enabled devices 508 with at least one of the received third data, received outlier data, and stored historical record for each of the IoT-enabled devices 508 to determine the vulnerability of the IoT-enabled device(s) 508 by generating a vulnerability detection signal, wherein the vulnerability detection signal contains the location coordinates of the IoT-enabled device(s) 508 identified to be vulnerable. In some embodiments, based on the same data the processing circuit 502 may also be configured to predict the vulnerability of the IoT-enabled device(s) 508 and generate a prediction signal, wherein the vulnerability prediction signal contains the location coordinates of the IoT-enabled device 508 identified to be vulnerable.

In some embodiments, the processing circuit 502 is adapted to establish the communication link with each of the IoT-enabled device 508, the remote data source 510, and the remote controllers 512 at unanticipated time intervals. For example, the processing circuit 502 may be adapted to establish the communication link at unanticipated time intervals, the unanticipated time intervals being bounded by a predefined range, for example, at some time between 3 minutes and 10 minutes from the last the communication link was established. The unanticipated time intervals within the predefined range may account for attacks that try to anticipate the times when the communication link will be established and pause and/or hide during such times to avoid detection. If the communication links are established at constant, unchanging intervals, the attacks can continue to hide during each update in perpetuity. By establishing the communication link at unanticipated time intervals such attacks may not be able to avoid detection in such a manner. It should be understood that these time intervals are merely exemplary and may be different in various embodiments.

In some embodiments, the predefined range bounding the unanticipated time intervals may be a single range throughout the life of the system. In some embodiments, the range may periodically change. For example, in a first month the unanticipated time intervals may establish the communication link between 3 and 10 minutes from the last time the communication link was established. In a second month, the range may change to 10 to 20 minutes from the last time the communication link was established. It should be understood that these time intervals are merely exemplary and may be different in various embodiments. In some embodiments, the ranges may change weekly, monthly, or even annually. By changing the bounds within which the communication links are established the system may combat attacks that attempt to learn and adapt to the intervals. In some embodiments, the unanticipated time intervals might be limited by a user-defined range. Depending on the application of the BMS, the operator may choose to select a smaller range, for example 3 to 5 minutes for every unanticipated time interval in a high-security use case, or 10 to 15 minutes for every unanticipated time interval in a low-security use case. In some embodiments, the limits of the unanticipated time intervals may be bounded by a minimum and maximum time value to ensure that the detection and prediction systems function properly. When a user selects time intervals below the minimum or beyond the maximum, the system may notify the user that the selected time intervals is outside the allowed range, and require the user to select an intervals within the range. In some embodiments, the system may simply set the unanticipated time intervals to a default range whenever an improper range is selected by a user.

In some embodiments, the unanticipated time intervals within the range may be established based on a hardware or software ID associated with each IoT-enabled device. For example, using the MAC ID of the IoT-enabled devices the system may generate unique unanticipated time intervals for each device. In some embodiments, the time intervals may be the same across all devices. In some embodiments, the communication link is established with each of the data sources (the IoT-enabled device 508, the remote data source 510, and the remote controllers 512) at same time interval. In some embodiments, the communication link is established with each of the IoT-enabled device 508, the remote data source 510, and the remote controllers 512 at different time intervals.

In some embodiments of the present disclosure, the system 500 includes a triggering unit 616, implemented using one or more processor(s), that is configured to generate at least one trigger signal at unanticipated time intervals, wherein the processing circuit 502 is enabled to establish the communication link upon receiving the trigger signal. In some embodiments, the triggering unit 616 is configured to generate the trigger signal at unanticipated time intervals within a predefined range. For example, the system may be adapted to establish the communication links at unanticipated time intervals at some time between 3 and 10 minutes. The triggering unit 616 may generate at least one trigger signal within that range. In some embodiments, the triggering unit 616 may be integrated with the processing circuit 502.

In some embodiments, the triggering unit 616 includes a timer 618 and a random pulse generator 620. The timer 618 is configured to generate an output signal having a constant frequency and a constant duty cycle. The random pulse generator 620 is configured to cooperate with the timer 618 to receive the output signal having constant frequent and constant duty cycle. Further, the random pulse generator 620 may be configured to generate the triggering signal (s. In some embodiments, the random pulse generator 620 may be configured to generate the triggering signal(s) at a randomly opted duty cycle of the output signal received from the timer 618 but within a predefined range.

In some embodiments, the system 500 includes a user interface 614 to enable an operator to interact with the processing circuit 502 to provide first data by means of one or more external storage devices, wherein the external storage device(s) may act as first data source 506. In another embodiment, the user interface 614 may facilitate the operator to mask and unmask the triggering signals generated by the triggering unit, and manually define time periods for establishing the communication link.

Referring again to FIG. 6, the processing circuit 502 includes a data retrieving unit 602, a vulnerability detection unit 604, a vulnerability prediction unit 608, the processor 606, and the memory 610. The data retrieving unit 602, the vulnerability detection unit 604, and the vulnerability prediction unit 608 may be implemented using one or more processor(s).

In some embodiments, the memory 610 may be configured to store a set of processing instructions, and the processor 606 may be enabled to cooperate with the memory 610 to receive the set of processing instructions to generate a set of processing commands. Additionally, the processor 606 may be configured to cooperate with the data retrieving unit 602, the vulnerability detection unit 604, and the vulnerability prediction unit 608, wherein the data retrieving unit 602, the vulnerability detection unit 604, and the vulnerability prediction unit 608 may be enabled to perform desired operation(s) under the influence of the processing commands generated by the processor 606.

In some embodiments the data retrieving unit 602 may be communicatively coupled with the communication module

612. The data retrieving unit 602 may be enabled to receive the triggering signal generated by the triggering unit 616, and may be further configured to generate a data logging signal. In some embodiments, since the triggering unit 616 is adapted to generate triggering signals at unanticipated time periods, the data logging signals generated by the data retrieving unit 602 are also generated at unanticipated time periods. In an alternative embodiment, the data retrieving unit 602 may be configured to of generate each data logging signal after a random delay time period subsequent to reception of the triggering signal which may enhance the security and add a factor of uncertainty to the system, thereby securing the communication link with the plurality of data feed sources, i.e., the IoT-enabled devices 508, the remote data sources 510, and the remote controllers 512.

In some embodiments, the data logging signal generated by the data retrieving unit 602 is transmitted to the communication module 612, wherein based on the data logging signal the communication module 612 is instructed to establish the communication link with one or more of the IoT-enabled devices 508, the remote data sources 510, and the remote controllers 512.

In some embodiments, the vulnerability detection unit 604 is configured to cooperate with the data retrieving unit 602, and may be further configured to, under the set of operating commands, receive the second data, the third data, and the outlier data associated with each of the IoT-enabled devices 508 from the data retrieving unit 602. Additionally, the vulnerability detection unit 604 may also be configured to access the first data and the historical records data stored within the memory 610. In some embodiments, the vulnerability detection unit 604 may receive the first data and the historical records pertaining to each of the IoT-enabled devices 508 via the processor 606, wherein the processor 606 may be enabled to selectively extract data and records pertaining to each of the plurality of IoT-enabled devices 508 from the memory 610.

Further, in some embodiments of the present disclosure, the vulnerability detection units 604 may be configured to analyze the outlier data with the second data, and generate the vulnerability detection signal. The vulnerability detection signal may be generated in the event information contained within the outlier data and the second data, pertaining to one or more IoT-enabled devices 508, indicates the presence of vulnerability.

In another embodiment, the vulnerability detection unit 604 may be configured to analyze the second data with the third data received from the remote data source, and may be further configured to generate the vulnerability detection signal when the information contained within the third data and the second data, pertaining to one or more of the IoT-enabled devices 508, indicates the presence of vulnerability. In some embodiments, the vulnerability detection unit 604 may be configured to analyze the first data and the third data, and in the event the information contained within the first data and the third data, pertaining to one or more IoT-enabled devices 508, indicates the presence of vulnerability, the vulnerability detection unit 604 may be further configured to scrutinize the first data and the second data for the IoT-enabled device 508 identified to be vulnerable to confirm the vulnerability of said IoT-enabled device 508.

In some embodiments, the vulnerability detection unit 604 may be configured to analyze at least one of or combination of the first data, the second data, the third data, and the outlier data, with the historical record to determine and predict vulnerability of a particular IoT-enabled device 508.

In some embodiments, the second data may be selected from the group consisting of, but not limited to, current software version information, open port information, anomalous behavior information, health information, and information pertaining to one or more control signals being generated by the associated IoT-enabled device(s) 508. The control signals may correspond to the signals being generated by the IoT-enabled device(s) 508 upon receiving sensed data generated by one or more peripheral devices connected with the IoT-enabled device. In another embodiment, each of the IoT-enabled device 508 may be provided with a thin agent configured to selectively transmit the second data subsequent to establishment of the communication link.

In some embodiments of the present disclosure, the second data may include information pertaining to one or more peripheral devices connected to the IoT-enabled device, wherein the associated IoT-enabled device 508 may be enabled to transmit the second data comprising data associated with said IoT-enabled device 508 and one or more peripheral devices connected to it. The peripheral devices may be sensors connected with the IoT-enabled device, and may have limited or no communication capabilities on their own.

In some embodiments the vulnerability prediction unit 608 of the processing circuit 502 is implemented using one or more processor(s). The vulnerability prediction unit 608 may be configured to, under the set of operating commands, receive the second data, the third data, and the outlier data associated with each of the IoT-enabled devices 508 from the data retrieving unit 602. Additionally, the vulnerability prediction unit 608 may also be configured to access the first data and the historical records data stored within the memory 610. In some embodiments, the vulnerability prediction unit 608 may be enabled to the access the historical records from the memory 610 via the processor 606. The vulnerability prediction unit 608 may be enabled to generate a prediction signal for one or more IoT-enabled devices 508, wherein the prediction signal generated may contain the location coordinates of the IoT-enabled device 508 predicted as vulnerable. The vulnerability prediction unit 608 may be configured to evaluate the information contained within the first data and the second data with one or more of the third data, outlier data, and historical records pertaining to each of the IoT-enabled devices 508 to generate the prediction signal.

In some embodiments, the prediction signal generated by the vulnerability prediction unit 608 comprises a value defining the probability of the IoT-enabled device 508 being vulnerable. The value defining the probability of being vulnerable may be based on at least source of data including the information contained within the second data, third data, and the outlier data. For example, the presence of outlier data and third data resulting in the prediction of an IoT-enabled device 508 being vulnerable may result in a high value of probability. On the contrary, if the prediction signal is generated based on only third data then the value of probability may be low. Still in other embodiments the value defining the probability of the IoT-enabled device 508 being vulnerable may be based on just the outlier data or the third data. The combinations of the various data sets that may be used to define the value of the probability that an IoT-enabled device 508 is vulnerable are merely exemplary, and it should be understood the combinations may vary in different embodiments.

In some embodiments, the operator may be enabled to weight one or more of said third data, outlier data, and historical record, wherein the value of prediction may be directly associated with the data used in the prediction of vulnerability. If, for an instance, each of the third data, outlier data, and the historical data points towards the IoT-enabled device 508 being vulnerable then the value of probability will be at its highest. In some embodiments, if one of the third data, the outlier data, and the historical data indicate that there is no vulnerability then, based on the weight assigned by the operator, the value of prediction for the IoT-enabled device 508 may be calculated considering the data indicating the possibility of vulnerability.

In some embodiments of the present disclosure, the vulnerability response unit 504 is communicatively coupled with the processing circuit 502 via the communication module 612. The vulnerability response unit 504 is implemented using one or more processor(s). The vulnerability response unit 504 is configured to generate a first notification signal after reception of the vulnerability detection signal, wherein the first notification signal is enabled to provide at least one of audio, visual, and textual based alerts to an operator. In some embodiments, the alerts may also include location coordinates of the IoT-enabled device 508 being vulnerable. In some embodiments the vulnerability response unit 504 is configured to generate a second notification signal subsequent to reception of the prediction signal, wherein the second notification signal is enabled to provide at least one of audio, visual, and textual based alerts to the operator, and in some embodiments the alerts may also include location coordinates of the IoT-enabled device 508 being predicted as vulnerable. In some embodiments, the vulnerability response unit 504 is configured to quarantine or isolate the device(s) predicted or detected to be vulnerable after reception of the vulnerability detection signal.

In some embodiments of the present disclosure, the vulnerability response unit 504 may be integrated with the processing circuit 502.

In some embodiments, the processing circuit 502 may be configured to compare the software version information contained within the third data with the software version information contained within the second data for each of the IoT-enabled devices 508, and may be further configured to generate a comparison signal when the software version information contained within the second data is identical with the third data. Subsequently, the processing circuit 502 may be configured to generate a vigilant signal upon generation of the comparison signal, wherein the vigilant signal contains the location coordinates of the IoT-enabled device 508 identified by the vigilant signal. In some embodiments, the processing circuit 502 may be configured to quarantine or isolate the device(s) associated with the comparison signal. In some embodiments, the processing circuit 502 may be configured to perform a software patch on the identified vulnerable IoT-enabled device, wherein the IoT-enabled device 508 may be patched to the application software information of which are contained in the first data. Alternatively, the processing circuit 502 may be configured to notify the operator.

In some embodiments, the processing circuit 502 is enabled to employ artificial intelligence for analyzing at least one of first data and second data with at least one of second data, outlier data, and historical record for each of the IoT-enabled devices 508.

In some embodiments of the present disclosure, the system for determining vulnerability of a BMS having a plurality of IoT-enabled devices 508 comprises a memory 610 and a processing circuit 502. The memory 610 is configured to store a first data, wherein the first data may be a layout comprising the plurality of IoT-enabled devices 508, and the location coordinates and application software details tagged to each of the IoT-enabled devices 508. The processing circuit 502 is configured to cooperate with the memory 610, and is communicatively coupled to a communication module 612 to establish a communication link for receiving a plurality of data feeds from a plurality of data sources at unanticipated time intervals, wherein the processing circuit 502 is configured to store the received data feeds in the memory 610 as historical feeds, and is further configured to analyze the one or more data feeds with the first data and the historical feed employing artificial intelligence for each of the IoT-enabled devices 508 to determine vulnerability of the business management system.

In some embodiments of the present disclosure, a system for predicting vulnerability of a BMS having a plurality of IoT-enabled devices 508 comprises a processing circuit 502 communicatively coupled to a communication module 612 to establish a communication link and receive a plurality of data feeds from a plurality of data sources at unanticipated time intervals, wherein the plurality of data feeds correspond to one or more of the IoT-enabled devices 508, the processing circuit 502 configured to store the received data feeds in the memory 610 as historical feeds, and is further configured to analyze at least one of the data feeds and historical feeds for each of the IoT-enabled device 508 by employing artificial intelligence to predict vulnerability of the business management system.

Figure 7A:
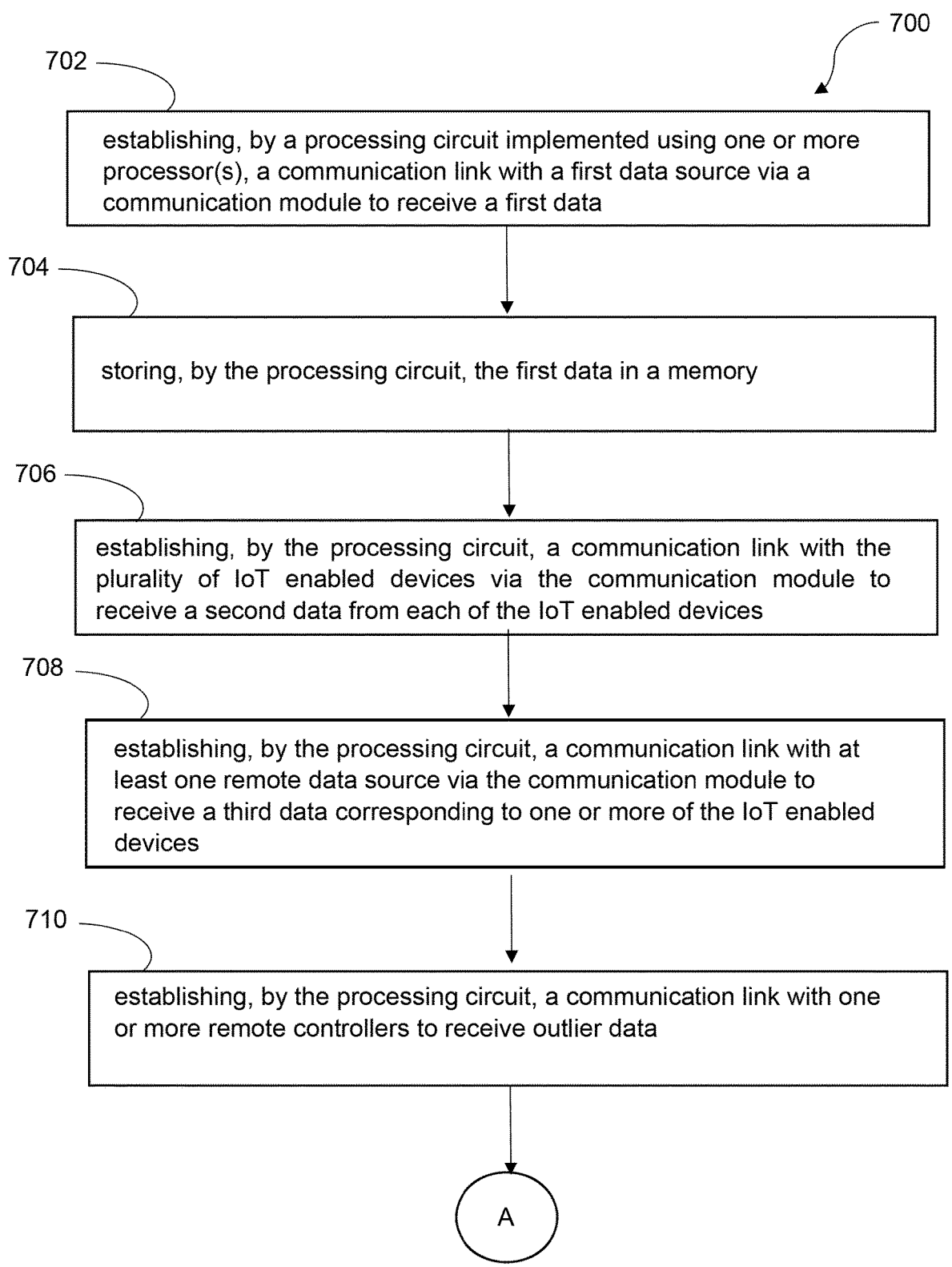
FIG. 7a and FIG. 7b are a flow chart depicting a method for determining and predicting vulnerability of the building management system (BMS) of FIG. 2 or FIG. 3.
Figure 7B:
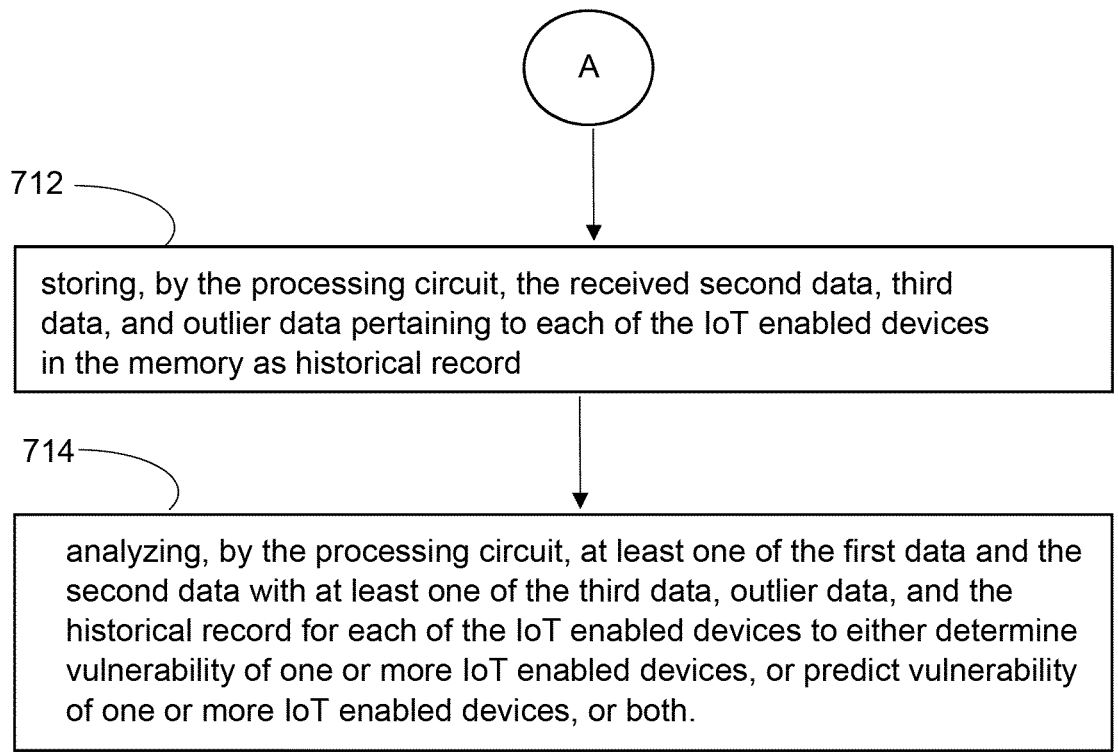

Method for Determining and Predicting Vulnerability of Building Management System Referring now to FIG. 7a and FIG. 7b, a method for determining and predicting vulnerability of a building management system (BMS) having a plurality of IoT-enabled devices 508 is disclosed.

The method performed by a processing circuit 502 in process 700 is shown to include the step of establishing a communication link (step 702), with a first data source via a communication module 612 to receive a first data. In some embodiments, the first data comprises a layout having location coordinates and application software details pertaining to each of the IoT-enabled devices 508. Further, the processing circuit 502 may be configured to store the received first data in a memory (step 704).

Process 700 is shown to include the processing circuit 502 establishing a communication link with the plurality of IoT-enabled devices 508 via the communication module 612 to receive the second data from each of the IoT-enabled devices 508 (step 706). In some embodiments, the second data comprises one or more information pertaining to one or more parameters of the IoT-enabled devices 508. In another embodiment, the second data may be selected from the group consisting of, but not limited to, current software version information, open port information, anomalous behavior information, health information, and information pertaining to one or more control signals being generated by associated IoT-enabled device 508.

Process 700 is shown to include establishing a communication link with at least one remote data source 510 via the communication module 612 to receive a third data corresponding to one or more IoT-enabled devices 508 (step 708).

Referring now specifically to FIG. 7b, process 700 at step 710 includes establishing a communication link with one or more remote controllers 512 to receive outlier data. Process 700 is shown to include storing the received second data, the received third data, and the outlier data pertaining to each of the IoT-enabled devices 508 in the memory 610 as historical record (step 712).

Process 700 is shown to include, at step 714 analyzing, with processing circuit 502 at least one of the first data and the second data with at least one of the third data, outlier data, and the historical record for each of the IoT-enabled devices 508 to determine vulnerability of one or more IoT-enabled devices 508, or predict vulnerability of one or more IoT-enabled devices 508, or both.

In some embodiments, the processing circuit 502 may be configured to generate a vulnerability detection signal upon determining the vulnerability of the IoT-enabled device, wherein the vulnerability detection signal comprises location coordinates of the IoT-enabled device. In another embodiment, the processing circuit 502 is configured to generate a prediction signal signifying the probability of the IoT-enabled device 508 being analyzed to be vulnerable, wherein the prediction signal comprises a value defining the probability of vulnerability and is determined based on the information contained within at least one of the second data, third data, historical record, and outlier data.

In some embodiments, the step of establishing the communication link, by the processing circuit, with each of the IoT-enabled devices 508, remote data sources 510, and the remote controllers 512 as shown in steps 706, 708 and 710 may further comprise the steps of generating an output signal having a constant frequency and a constant duty cycle, randomly choosing a duty cycle of the generated output signal to generate a trigger signal, and establishing at least one communication link via said communication module 612 after generation of the trigger signal.

In some embodiments, the processing circuit 502 is configured to establish the communication link with at least one of the IoT-enabled devices 508, remote data sources 510, and remote controllers 512 at unanticipated time intervals. In some embodiments, the unanticipated time intervals are bounded by a range. In some embodiments, the range may change periodically. In some embodiments, the range may be user-selectable. In some embodiments, the unanticipated time intervals are selected from times within the range using a random number generator. In some embodiments, the unanticipated time intervals are selected from times within the range using hardware or software IDs associated with each IoT-enabled device. For example, the range of time intervals can be form 5 minutes to 30 minutes, the intervals can be random selections of 5 minutes, 12, minutes, 18, minutes, 14, minutes. 29 minutes, etc.

In some embodiments, the step of determining vulnerability of the IoT-enabled device 508 as shown in step 714 further comprises the step of analyzing the outlier data with the second data and generating an vulnerability detection signal in the event information contained within the outlier data and the second data does not match, wherein generation of the vulnerability detection signal signifies determining the vulnerability of the IoT-enabled device 508. In some embodiments, determining the vulnerability of the IoT-enabled device may further include the step of analyzing the third data received from the remote data source 510 with the second data, and generating the vulnerability detection signal in the event information contained within the third data and the second data does not match, wherein generation of the vulnerability detection signal signifies determining the vulnerability of the IoT-enabled device. The step may further comprise analyzing the first data with the third data to generate a flag signal indicating detection of threat for the IoT-enabled device 508, and scrutinizing the first data and the second data of the device having threat to generate vulnerability detection signal determining vulnerability of the IoT-enabled device 508.

Referring back to FIG. 6, in some embodiments of the present disclosure, the method comprises the step of providing notification to an operator by a vulnerability response unit 504. The method comprises the steps of generating a first notification signal after reception of the vulnerability detection signal, wherein the first notification signal is enabled to provide at least one of audio, visual, and textual based alert to an operator indicating coordinates of the IoT-enabled device 508 being vulnerable, and generating a second notification signal after reception of the prediction signal, wherein the second notification signal is enabled to provide at least one of audio, visual, and textual based alerts to the operator indicating the coordinates of the IoT-enabled device 508 predicted to be vulnerable.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for predicting the vulnerability of a building management system (BMS), the system comprising:
one or more memory devices configured to store instructions that, when executed on one or more processors, cause the one or more processors to:
establish a first communication link to a first data source and receive a first data using a communication module communicatively coupled to the processor, wherein the first data includes information related to at least one of a plurality of IoT-enabled devices within the BMS;
establish, at an unanticipated time interval of a plurality of unanticipated time intervals within a predefined range using the communication module, a plurality of communications links with a plurality of data sources to receive a plurality of data feeds from the plurality of data sources;
generate a historical record composed of the plurality of data feeds received from the plurality of data sources;
analyze at least one of the plurality of data feeds with at least one or more of the first data, the historical record, and another of the plurality of data feeds to predict the vulnerability of the BMS; and
at least one of quarantine or isolate one or more of the plurality of IoT-enabled devices based on the predicted vulnerability of the BMS.

2. The system of claim 1, wherein the information contained in the first data comprises a layout having at least one or more of location information and application software details corresponding to at least one of the plurality of IoT-enabled devices.

3. The system of claim 1, wherein the plurality of data sources comprises at least one or more of at least one of a plurality of IoT-enabled devices, at least one of a plurality of remote data sources, and at least one of a plurality of remote controllers.

4. The system of claim 1, wherein the plurality of data feeds comprises:
a second data received from the at least one of the plurality of IoT-enabled devices comprising at least one or more of current software version information, open port information, anomalous behavior information, health information, and information pertaining to one or more control signals generated by the at least one of the plurality of IoT-enabled devices.

5. The system of claim 1, wherein the plurality of data feeds comprises:
a third data received from at least one of a plurality of remote data sources comprising at least one or more of information corresponding to one or more parameters populated with the second data, and threat information pertaining to one or more of the plurality of IoT-enabled devices.

6. The system of claim 1, wherein the plurality of data feeds comprises:
an outlier data received from at least one of the plurality of remote controllers wherein the outlier data is data signifying an unexpected outcome based on the data being beyond a desirable range for a given IoT-enabled device.

7. The system of claim 1, wherein at least one of the unanticipated time intervals periodically change.

8. The system of claim 1, wherein the unanticipated time intervals are the same length.

9. The system of claim 1, wherein at least one of the data feeds is analyzed using artificial intelligence.

10. The system of claim 1, wherein to predict the vulnerability of the BMS, the system is further configured to:
send the first data and at least one of the plurality of data feeds to a remote computing system; and
receive a vulnerability determination from the remote computing system.

11. The system of claim 10, wherein the vulnerability determination includes a vulnerability prediction.

12. The system of claim 1, wherein to predict the vulnerability of the BMS, the system is further configured to determine a vulnerability of the one or more of the plurality of IoT-enabled devices and generate a vulnerability detection signal, wherein the vulnerability detection signal comprises location information of the one or more of the plurality of IoT-enabled devices.

13. The system of claim 1, wherein to predict the vulnerability of the BMS, the system is further configured to predict a vulnerability of the one or more of the plurality of IoT-enabled devices and generate a prediction signal, wherein the prediction signal comprises location information of the one or more of the plurality of IoT-enabled devices.

14. The system of claim 1, wherein to predict the vulnerability of the BMS, the system is further configured to:
determine a vulnerability of the one or more of the plurality of IoT-enabled devices and generate a vulnerability detection signal, wherein the vulnerability detection signal comprises location information of the one or more of the plurality of IoT-enabled devices; and
predict the vulnerability of the one or more of the plurality of IoT-enabled devices and generate a prediction signal, wherein the prediction signal comprises location information of the vulnerable one or more of the plurality of IoT-enabled devices.

15. The system of claim 1, wherein the one or more memory devices are further configured to store instructions that, when executed on the one or more processors, cause the one or more processors to:
generate a vulnerability detection signal in response to determining the vulnerability of the BMS;
initiate a vulnerability response unit communicatively coupled with one or more of the processors, the vulnerability response unit configured to:
generate a first notification signal after receiving the vulnerability detection signal, wherein the first notification signal provides at least one or more of: an audio, visual, and textual based alert to an operator indicating location coordinates of the IoT-enabled device that is vulnerable; and
generate a second notification signal after receiving the prediction signal, wherein the second notification signal is configured to provide at least one or more of: an audio, visual, or textual alert to the operator indicating the location coordinates of the IoT-enabled device that is predicted to be vulnerable.

16. A method for determining and predicting the vulnerability of a BMS comprising:
receiving a first data from a first data source comprising location coordinates and application software details corresponding to at least one of a plurality of IoT-enabled devices located within the BMS;

storing the first data in a memory;
establishing with a processing circuit and a communication module a second communication link with the plurality of IoT-enabled devices at a first unanticipated time interval within a predefined range;
receiving, across the second communication link, second data from the plurality of IoT-enabled devices, wherein the second data comprises information pertaining to one or more parameters of the IoT-enabled devices;
establishing with the processing circuit and the communication module a third communication link with at least one remote data source at a second unanticipated time interval within the predefined range;
receiving, across the third communication link, a third data from the remote data source corresponding to at least one of the IoT-enabled devices;
establishing with the processing circuit and the communication module a fourth communication link with at least one remote controller at a third unanticipated time interval within the predefined range;
receiving, across the fourth communication link, an outlier data from the remote controller;
storing the second data, third data, and outlier data in the memory as a historical record;
analyzing at least one of said first data and said second data with at least one of the third data, outlier data, and historical record to determine vulnerability of one or more of the plurality of IoT-enabled devices and predict the vulnerability of one or more of the plurality of IoT-enabled devices; and
at least one of quarantining or isolating the one or more of the plurality of IoT-enabled devices based on at least one of the determined vulnerability or the predicted vulnerability of the one or more of the plurality of IoT-enabled devices.

17. The method of claim 16 further comprising:
generating a first notification signal after receiving the vulnerability detection signal, wherein the first notification signal provides at least one or more of: audio, visual, and textual based alerts to an operator indicating location of the one or more of the plurality of IoT-enabled devices that is vulnerable; and
generating a second notification signal after receiving the prediction signal, wherein the second notification signal is enabled to provide at least one or more of: audio, visual, and textual based alerts to the operator indicating the location of the one or more of the plurality of IoT-enabled devices predicted to be vulnerable.

18. The method of claim 16, wherein establishing the second, third, and fourth communication links comprises:
generating an output signal having a constant frequency and a constant duty cycle;
randomly selecting a duty cycle of the output signal to generate a trigger signal, and
establishing at least one or more of: the first, second, third, and fourth communication links using the communication module after generation of the trigger signal.

19. The method of claim 16, wherein the processing circuit is configured to establish the first, second, third and fourth communication links at unanticipated time intervals and determining the vulnerability of the one or more of the plurality of IoT-enabled devices comprises:
analyzing the outlier data with the second data and generating a vulnerability detection signal when the information contained in the outlier data and the second data do not match, wherein the generation of the vulnerability detection signal comprises the step of determining vulnerability of the one or more of the plurality of IoT-enabled devices;
analyzing the third data with the second data and generating a vulnerability detection signal when the information contained in the third data and the second data do not match, wherein the generation of the vulnerability detection signal comprises the step of determining vulnerability of the one or more of the plurality of IoT-enabled devices;
analyzing the first data with the third data and generating a flag signal indicating detection of a threat for the one or more of the plurality of IoT-enabled devices; and
analyzing the first data with the second data of the one or more of the plurality of IoT-enabled devices with the threat to generate a vulnerability detection signal wherein the generation of the vulnerability detection signal comprises the step of determining vulnerability of the one or more of the plurality of IoT-enabled devices.

20. A system for determining the vulnerability of a building management system (BMS), the system comprising:
one or more memory devices configured to:
establish a first communication link to a first data source and receive a first data using a communication module communicatively coupled to the processor, wherein the first data includes information related to at least one of a plurality of IoT-enabled devices;
concurrently establish, at unanticipated time intervals within a predefined range, using the communication module a plurality of communication links with a plurality of data sources to receive a plurality of received data feeds from the plurality of data sources;
provide a historical record composed of the plurality of received data feeds;
analyze at least one of the plurality of data feeds with at least one or more of: the first data, the historical record, and another of the plurality of data feeds to determine the vulnerability of the BMS; and
at least one of quarantine or isolate one or more of the plurality of IoT-enabled devices based on the determined vulnerability of the BMS.

* * * * *